US012598029B2

(12) United States Patent
Li et al.

(10) Patent No.: US 12,598,029 B2
(45) Date of Patent: Apr. 7, 2026

(54) SIDELINK CARRIER AGGREGATION WITH CROSS-CARRIER RETRANSMISSION

(71) Applicant: QUALCOMM Incorporated, San Diego, CA (US)

(72) Inventors: Qing Li, Princeton Junction, NJ (US); Kapil Gulati, Belle Mead, NJ (US); Seyedkianoush Hosseini, San Diego, CA (US); Junyi Li, Fairless Hills, PA (US); Stelios Stefanatos, San Diego, CA (US); Ozcan Ozturk, San Diego, CA (US); Gabi Sarkis, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/556,765

(22) PCT Filed: Jun. 1, 2022

(86) PCT No.: PCT/US2022/031796
§ 371 (c)(1),
(2) Date: Oct. 23, 2023

(87) PCT Pub. No.: WO2022/260908
PCT Pub. Date: Dec. 15, 2022

(65) Prior Publication Data
US 2024/0223315 A1     Jul. 4, 2024

(30) Foreign Application Priority Data
Jun. 7, 2021     (GR) .............................. 20210100369

(51) Int. Cl.
*H04L 1/1822* (2023.01)
*H04L 1/1829* (2023.01)
(Continued)

(52) U.S. Cl.
CPC .......... *H04L 1/1822* (2013.01); *H04L 1/1861* (2013.01); *H04W 72/25* (2023.01); *H04W 74/0808* (2013.01)

(58) Field of Classification Search
CPC ... H04L 1/1822; H04L 1/1861; H04L 5/0048; H04L 5/0051; H04L 27/0006;
(Continued)

(56) References Cited

U.S. PATENT DOCUMENTS

| | | | | |
|---|---|---|---|---|
| 2020/0314804 A1* | 10/2020 | Shin | ...................... | H04L 5/0055 |
| 2021/0410114 A1* | 12/2021 | Lee | .......................... | H04L 1/189 |
| 2022/0132418 A1* | 4/2022 | Hofmann | .......... | H04W 28/0215 |

OTHER PUBLICATIONS

Intel Corporation: "Resource Allocation Mode-2 for NR V2X Sidelink Communication," 3GPP TSG RAN WG1 Meeting #98bis, R1-1910650, 3rd Generation Partnership Project (3GPP), Mobile Competence Centre, 650, Route Des Lucioles, F-06921 Sophia-Antipolis Cedex, France, vol. RAN WG1 No. Chongqing, China, Oct. 14-20, 2019, Oct. 8, 2019, pp. 1-28, The whole document, pp. 3,7,17; figure 4, pp. 1-15.

(Continued)

*Primary Examiner* — Afshawn M Towfighi
(74) *Attorney, Agent, or Firm* — Loza & Loza, LLP

(57) ABSTRACT

A transmitting sidelink device assigns a transport block (TB) to a logical hybrid automatic repeat request (HARQ) entity, maps the TB to an carrier, transmits the TB to a receiving sidelink device, the TB is associated with a first sidelink control information (SCI) that cross-references the TB to an identifier of the logical HARQ entity, maps the TB to a different carrier, and retransmits the TB on the different carrier, the retransmitted TB is associated with a second SCI that cross-references the TB to the identifier of the logical HARQ entity. A receiving sidelink device receives the TB and SCI, maps the TB to the identified logical HARQ entity, detects the retransmission, and maps the retransmission to (Continued)

the identified logical HARQ entity. A transmitting sidelink device generates packets in advance and transmits one of the generated packets when required.

28 Claims, 20 Drawing Sheets

(51) Int. Cl.
  *H04W 72/25*          (2023.01)
  *H04W 74/0808*        (2024.01)
(58) Field of Classification Search
  CPC ..... H04L 5/001; H04L 5/0055; H04L 1/1887;
                    H04W 72/25; H04W 74/0808
  See application file for complete search history.

(56)                    References Cited

OTHER PUBLICATIONS

Intel Corporation: "Summary#1 for AI 7.2.4.2.2 Mode-2 Resource Allocation", 3GPP TSG RAN WG1 Meeting #98bis, R1-1911347, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14-2, 2019, Oct. 22, 2019 (Oct. 22, 2019), 33 Pages, XP051798627, pp. 18,25. International Search Report and Written Opinion—PCT/US2022/ 031796—ISA/EPO—Sep. 13, 2022.

* cited by examiner

FIG. 12

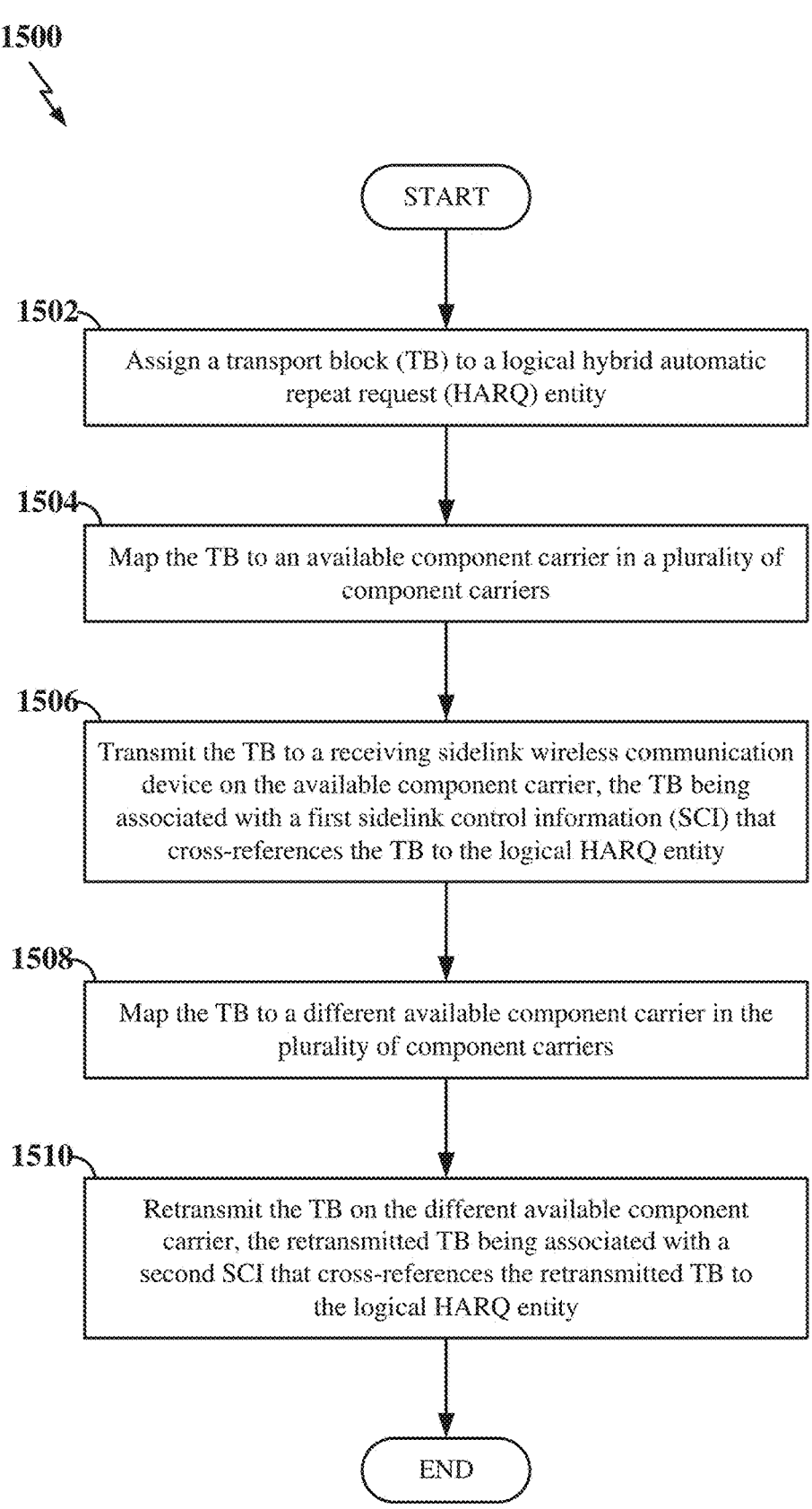

1500

START

1502 — Assign a transport block (TB) to a logical hybrid automatic repeat request (HARQ) entity 1504 — Map the TB to an available component carrier in a plurality of component carriers 1506 — Transmit the TB to a receiving sidelink wireless communication device on the available component carrier, the TB being associated with a first sidelink control information (SCI) that cross-references the TB to the logical HARQ entity 1508 — Map the TB to a different available component carrier in the plurality of component carriers 1510 — Retransmit the TB on the different available component carrier, the retransmitted TB being associated with a second SCI that cross-references the retransmitted TB to the logical HARQ entity

END

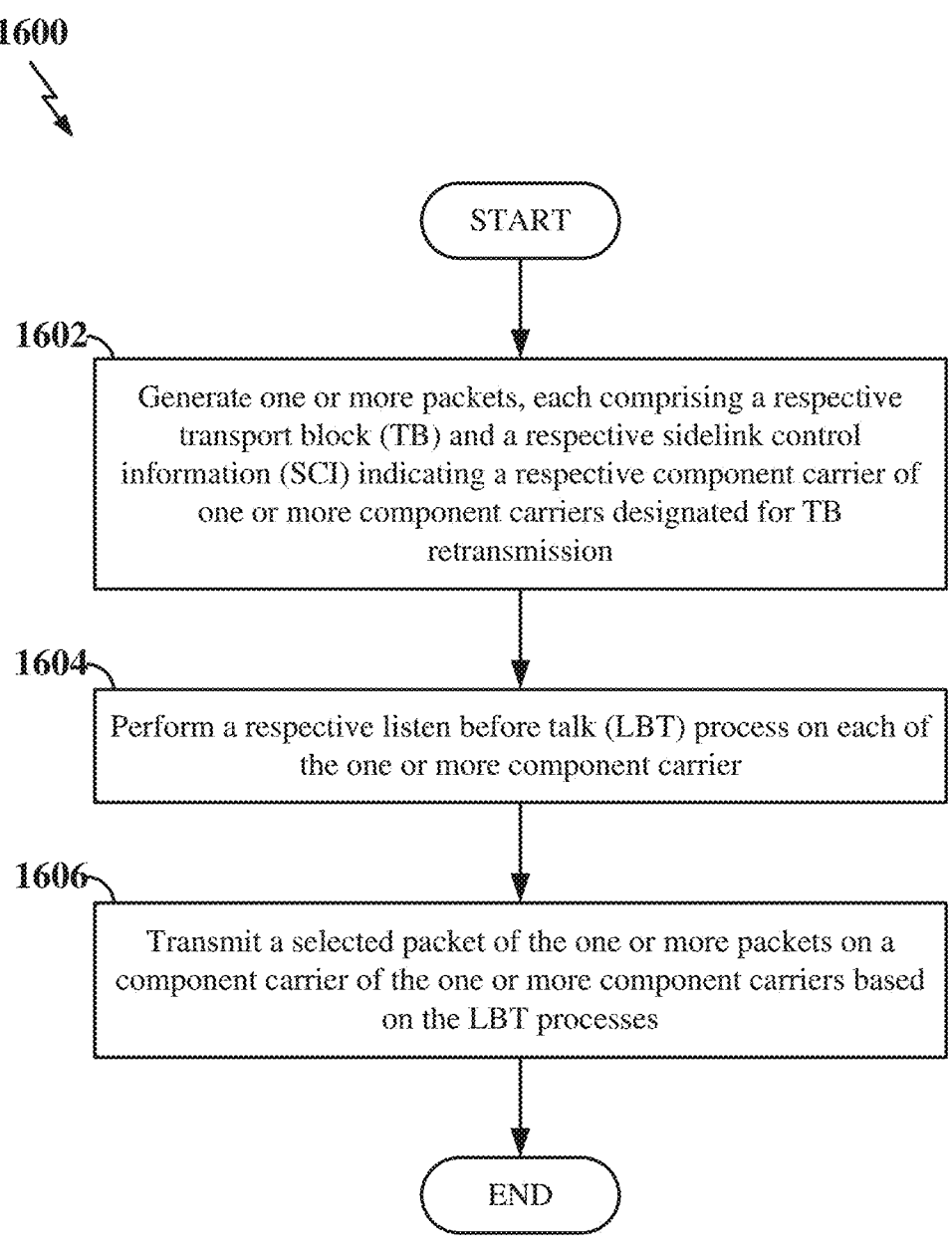

START

1602

Generate one or more packets, each comprising a respective transport block (TB) and a respective sidelink control information (SCI) indicating a respective component carrier of one or more component carriers designated for TB retransmission

1604

Perform a respective listen before talk (LBT) process on each of the one or more component carrier

1606

Transmit a selected packet of the one or more packets on a component carrier of the one or more component carriers based on the LBT processes

END

Figure 18:
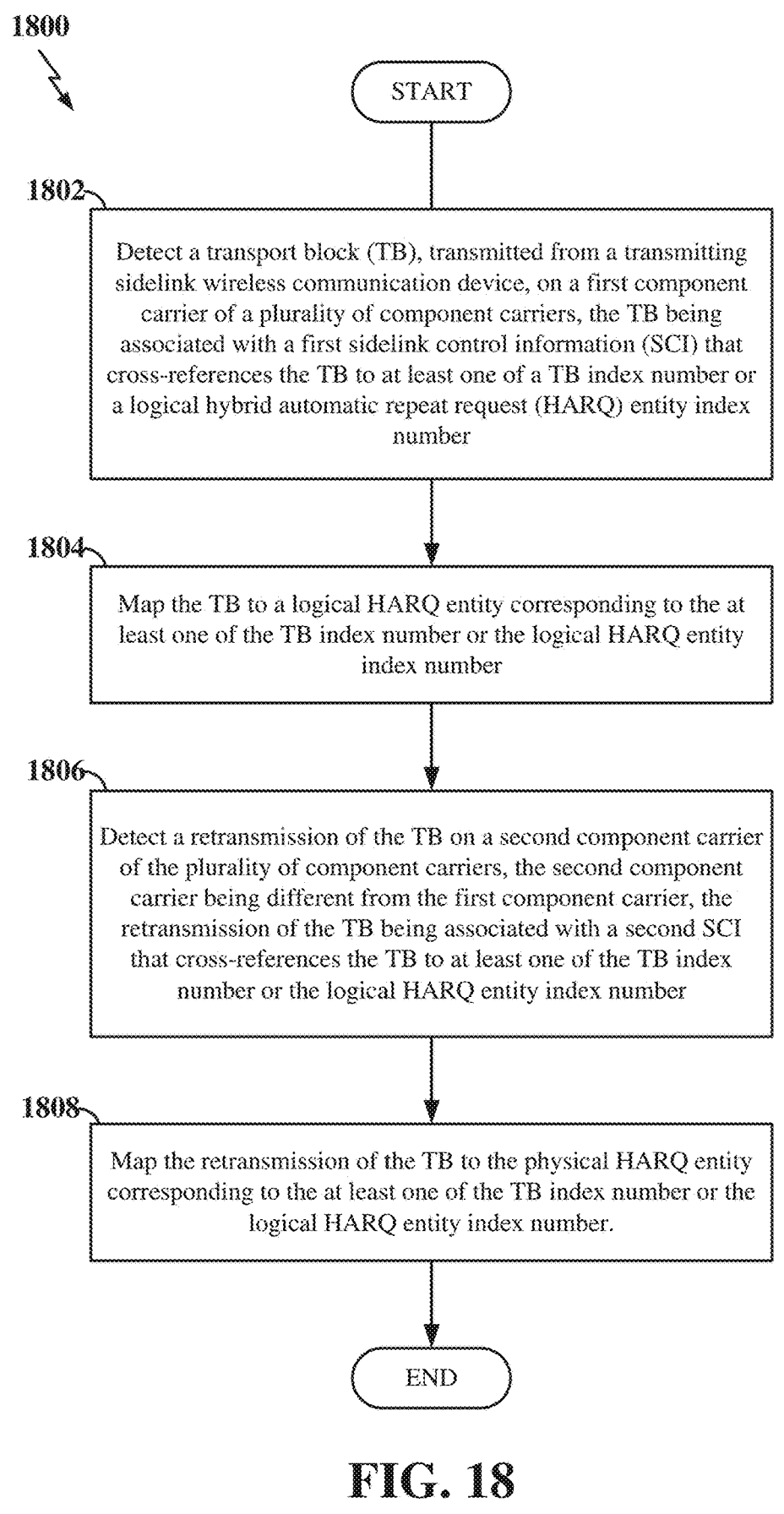

START

1802

Detect a transport block (TB), transmitted from a transmitting sidelink wireless communication device, on a first component carrier of a plurality of component carriers, the TB being associated with a first sidelink control information (SCI) that cross-references the TB to at least one of a TB index number or a logical hybrid automatic repeat request (HARQ) entity index number

1804

Map the TB to a logical HARQ entity corresponding to the at least one of the TB index number or the logical HARQ entity index number

1806

Detect a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number

1808

Map the retransmission of the TB to the physical HARQ entity corresponding to the at least one of the TB index number or the logical HARQ entity index number.

END

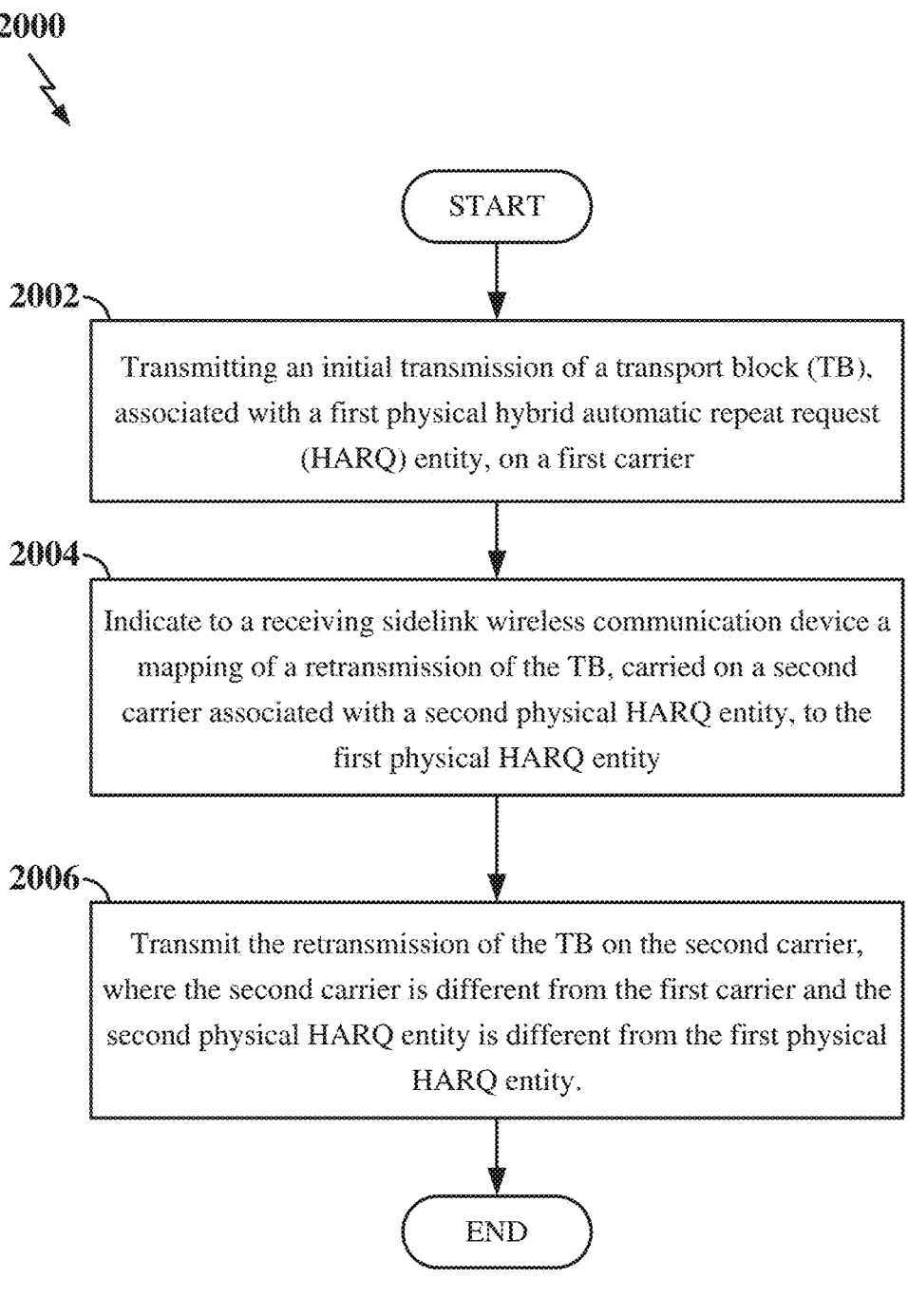

START

2002

Transmitting an initial transmission of a transport block (TB), associated with a first physical hybrid automatic repeat request (HARQ) entity, on a first carrier

2004

Indicate to a receiving sidelink wireless communication device a mapping of a retransmission of the TB, carried on a second carrier associated with a second physical HARQ entity, to the first physical HARQ entity

2006

Transmit the retransmission of the TB on the second carrier, where the second carrier is different from the first carrier and the second physical HARQ entity is different from the first physical HARQ entity.

END

FIG. 20

SIDELINK CARRIER AGGREGATION WITH CROSS-CARRIER RETRANSMISSION

CROSS-REFERENCE TO RELATED APPLICATIONS

This application is the U.S. national stage of PCT patent application number PCT/US2022/031796 filed on Jun. 1, 2022. Application No. PCT/US2022/031796 claims priority to Greece application No. 20210100369, filed Jun. 7, 2021, and assigned to the assignee hereof and hereby expressly incorporated by reference herein as if fully set forth below and for all applicable purposes.

TECHNICAL FIELD

The technology discussed below relates generally to wireless communication systems, and more particularly, to sidelink carrier aggregation with cross-carrier scheduling.

INTRODUCTION

In sidelink communication networks, a transmitting wireless communication device may perform a listen-before-talk (LBT) process before transmitting a packet on, for example, a sidelink shared channel (SL-SCH). The packet transmission may occur in response to the LBT process returning a favorable result (e.g., an LBT pass). However, if the LBT process returns an unfavorable result (e.g., an LBT fail), the transmitting wireless communication device may wait for a time (e.g., a backoff time) before again performing the LBT process and eventually transmitting the packet.

Wireless communication devices may utilize hybrid automatic repeat request (HARQ) to ensure the correct delivery of packets communicated between the wireless communication devices. HARQ entities are associated with one transport block and one component carrier in carrier aggregation configurations. The one component carrier carries all retransmissions of the one transport block. Delays in retransmission of a transport block on a given component carrier may occur when an LBT process indicates an LBT fail result for the given component carrier. Other component carriers are unavailable for retransmission of the transport block due to a one-to-one-to-one association between the transport block, a HARQ entity, and the given component carrier.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of cross-carrier retransmission in a wireless communication network at a transmitting sidelink wireless communication device is disclosed. The method can include assigning a transport block (TB) to a logical hybrid automatic repeat request (HARQ) entity, mapping the TB to an available component carrier in a plurality of component carriers, transmitting the TB to a receiving sidelink wireless communication device on the available component carrier, the TB being associated with a first sidelink control information (SCI) that cross-references the TB to at least one of a TB index number or a logical HARQ entity index number of the logical HARQ entity, mapping the TB to a different available component carrier in the plurality of component carriers, and retransmitting the TB on the different available component carrier, the retransmitted TB being associated with a second SCI that cross-references the retransmitted TB to the logical HARQ entity.

In another example, a method of wireless communication at a receiving sidelink wireless communication device is disclosed. The method can include detecting a transport block (TB), transmitted from a transmitting sidelink wireless communication device, on a first component carrier of a plurality of component carriers, the TB being associated with a first sidelink control information (SCI) that cross-references the TB to at least one of a TB index number or a logical hybrid automatic repeat request (HARQ) entity index number, mapping the TB to a logical HARQ entity corresponding to the at least one of the TB index number or the logical HARQ entity index number, detecting a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number, and mapping the retransmission of the TB to the logical HARQ entity corresponding to the at least one of the TB index number or the logical HARQ entity index number.

In still another example, a method of cross-carrier retransmission in an unlicensed band of a wireless communication network at a transmitting sidelink wireless communication device is disclosed. The method can include generating one or more packets, each comprising a respective transport block (TB) and a respective sidelink control information (SCI) indicating a respective component carrier of one or more component carriers designated for TB retransmission, performing a respective listen before talk (LBT) process on each of the one or more component carriers, and transmitting a selected packet of the one or more packets on a component carrier of the one or more component carriers based on the LBT processes.

In another example, a method of transport block (TB) retransmission at a transmitting sidelink wireless communication device in a wireless communication network is disclosed. The method can include transmitting an initial transmission of a transport block (TB), associated with a first physical hybrid automatic repeat request (HARQ) entity, on a first carrier, indicating to a receiving sidelink wireless communication device a mapping of a retransmission of the TB, carried on a second carrier associated with a second physical HARQ entity, to the first physical HARQ entity, and transmitting the retransmission of the TB on the second carrier, where the second carrier is different from the first carrier and the second physical HARQ entity is different from the first physical HARQ entity.

These and other aspects will become more fully understood upon a review of the detailed description, which follows. Other aspects, features, and examples will become apparent to those of ordinary skill in the art upon reviewing the following description of specific, exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 12 is an orthogonal frequency divisional multiplexing (OFDM) resource grid illustrating four component carriers and twelve slots according to some aspects of the disclosure.

FIG. 15 is a flow chart illustrating an exemplary process at a transmitting sidelink wireless communication device utilizing logical HARQ entities to execute cross-carrier retransmission of transport blocks according to some aspects of the disclosure.

FIG. 16 is a flow chart illustrating an exemplary process at a transmitting sidelink wireless communication device for generating one or more packets in advance according to some aspects of the disclosure.

FIG. 18 is a flow chart illustrating an exemplary process at a receiving sidelink wireless communication device utilizing logical HARQ entities and a mapping feature to execute cross-carrier retransmission of transport blocks according to some aspects of the disclosure.

FIG. 20 is a flow chart illustrating an exemplary process at a transmitting sidelink wireless communication device utilizing dynamic assignment of transport blocks to component carriers according to some aspects of the disclosure.

DETAILED DESCRIPTION

Figure 1:
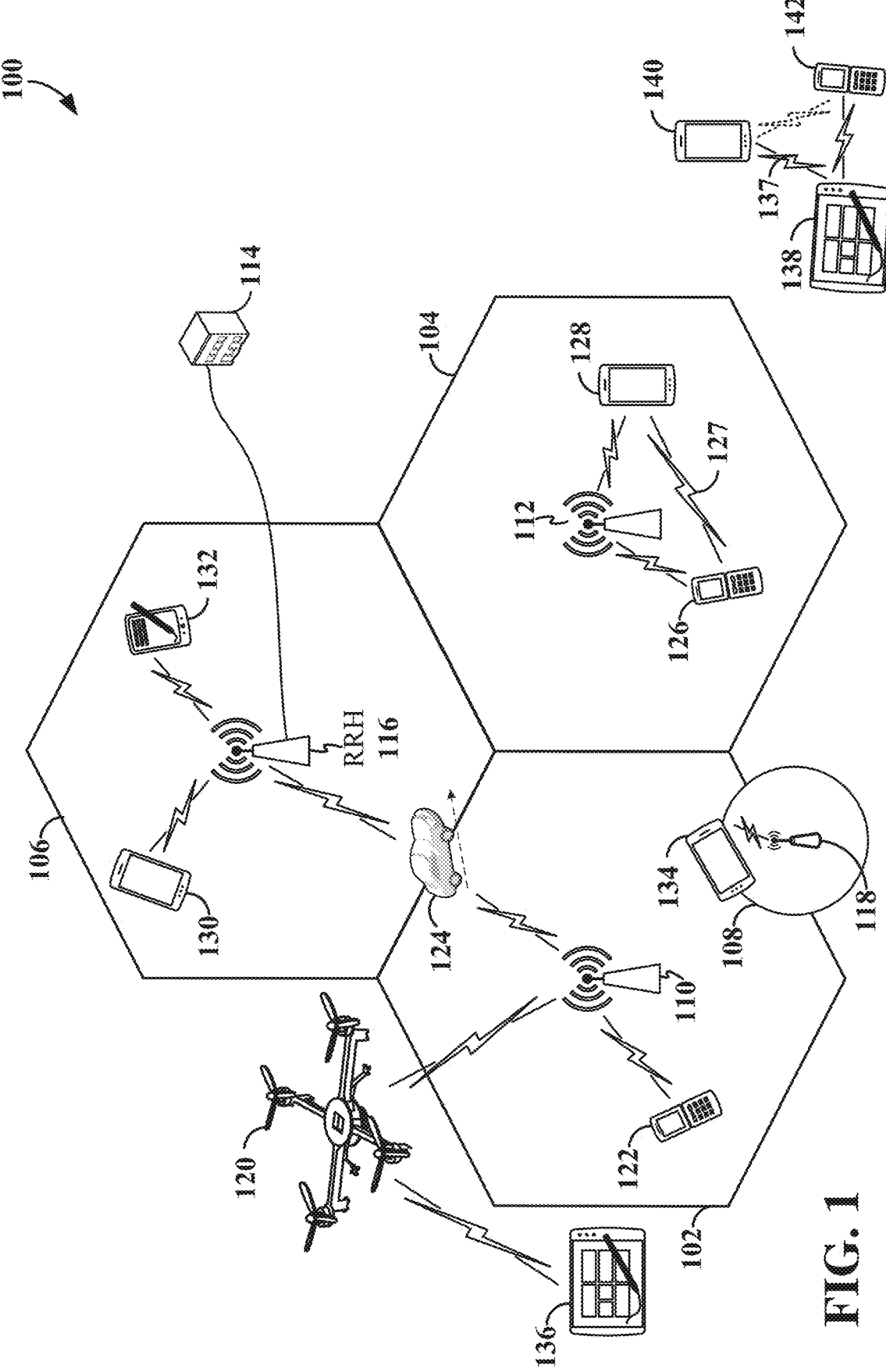
FIG. 1 is a schematic illustration of an example of a radio access network (RAN) according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

According to aspects described herein, a sidelink wireless communication device may utilize logical HARQ entities, which may be different from physical HARQ entities, and listen before talk (LBT) processes to assign a transport block (TB) to a given logical HARQ entity and to transmit the TB on any component carrier that satisfies the LBT process without regard to whether the TB was initially, or subsequently, transmitted on the component carrier. A transmitting sidelink wireless communication device may include sidelink control information (SCI) with the TB. The SCI may cross-reference the TB carried on the component carrier to a TB index number and/or a logical HARQ entity identifier. A receiving sidelink wireless communication device receiving the TB with the SCI may use the SCI to map the TB to a logical HARQ entity of the receiving sidelink wireless communication device.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118, and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink wireless communications device and/or a scheduled entity or a receiving sidelink wireless communications device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
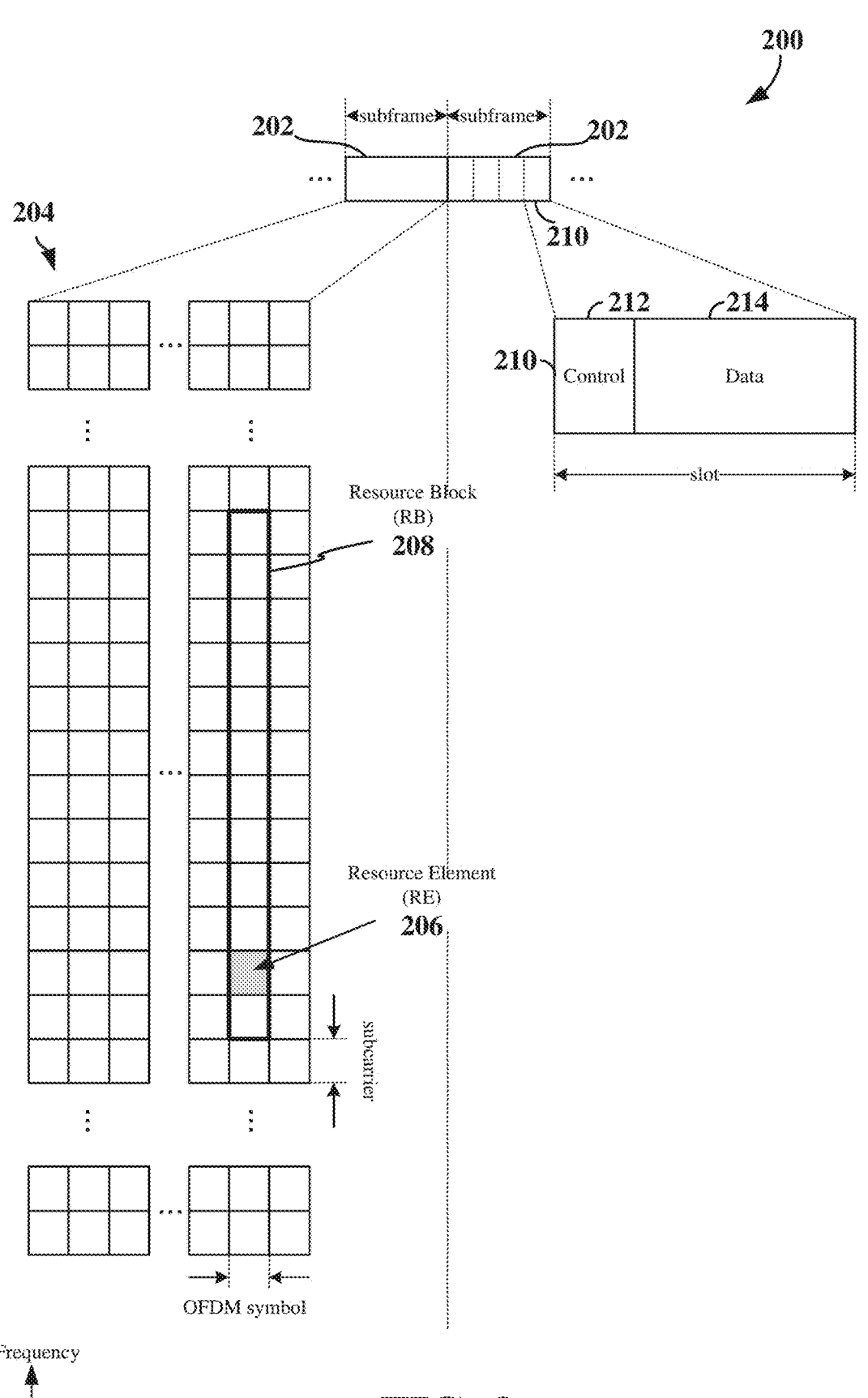
FIG. 2 is an expanded view of an exemplary subframe, showing an orthogonal frequency divisional multiplexing (OFDM) resource grid according to some aspects of the disclosure.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink wireless communications devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink wireless communications device implementing D2D sidelink communication.

In this illustration, the RB 208 is shown as occupying less than the entire bandwidth of the subframe 202, with some subcarriers illustrated above and below the RB 208. In a given implementation, the subframe 202 may have a band-width corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink wireless communications device (e.g., Tx V2X device or other Tx UE) towards a set of one or more other receiving sidelink wireless communications devices (e.g., Rx V2X device or other Rx UE). The data region 214 of the slot 210 may include a physical sidelink shared channel (PSSCH) including sidelink data traffic transmitted by the initiating (transmitting) sidelink wireless communications device within resources reserved over the sidelink carrier by the transmitting sidelink wireless communications device via the SCI. Other information may further be transmitted over various REs 206 within slot 210. For example, HARQ feedback information may be transmitted in a physical sidelink feedback channel (PSFCH) within the slot 210 from the receiving sidelink wireless communications device to the transmitting sidelink wireless communications device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
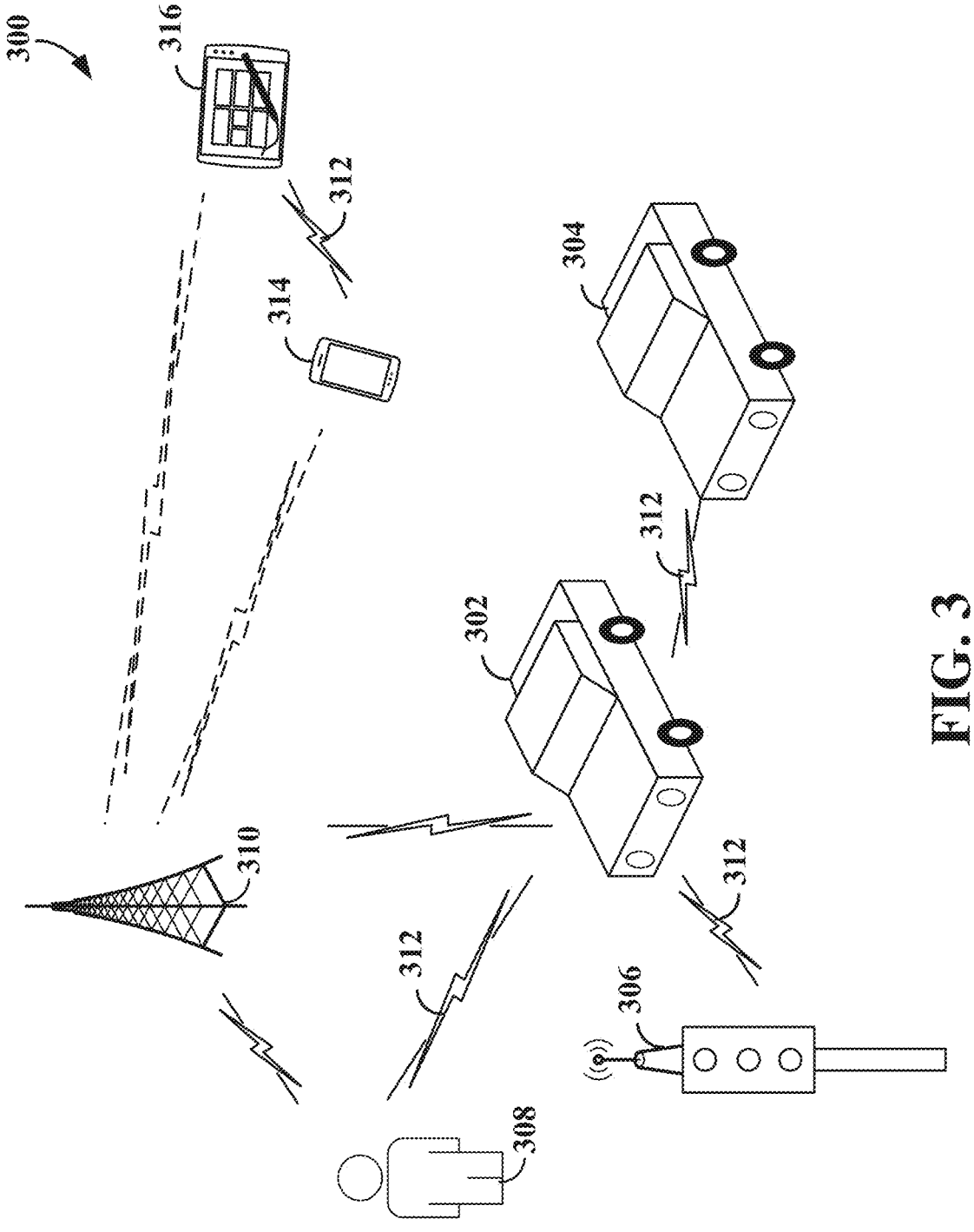
FIG. 3 is an example of a wireless communication network configured to support device-to-device (D2D) or sidelink communication according to some aspects of the disclosure.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/ or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink wireless communications devices (e.g., V2X devices or other sidelink wireless communications devices) for sidelink communication between the sidelink wireless communications devices in various manners. For example, the base station 310 may allocate sidelink resources dynamically (e.g., a dynamic grant) to sidelink wireless communications devices, in response to requests for sidelink resources from the sidelink wireless communications devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink wireless communications devices. In some examples, the base station 310 may activate a configured grant (CG) via RRC signaling. In Mode 1, sidelink feedback may be reported back to the base station 310 by a transmitting sidelink wireless communications device.

In a second mode, Mode 2, the sidelink wireless communications devices may autonomously select sidelink resources for sidelink communication therebetween. In some examples, a transmitting sidelink wireless communications device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QOS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figures 4A, 4B:
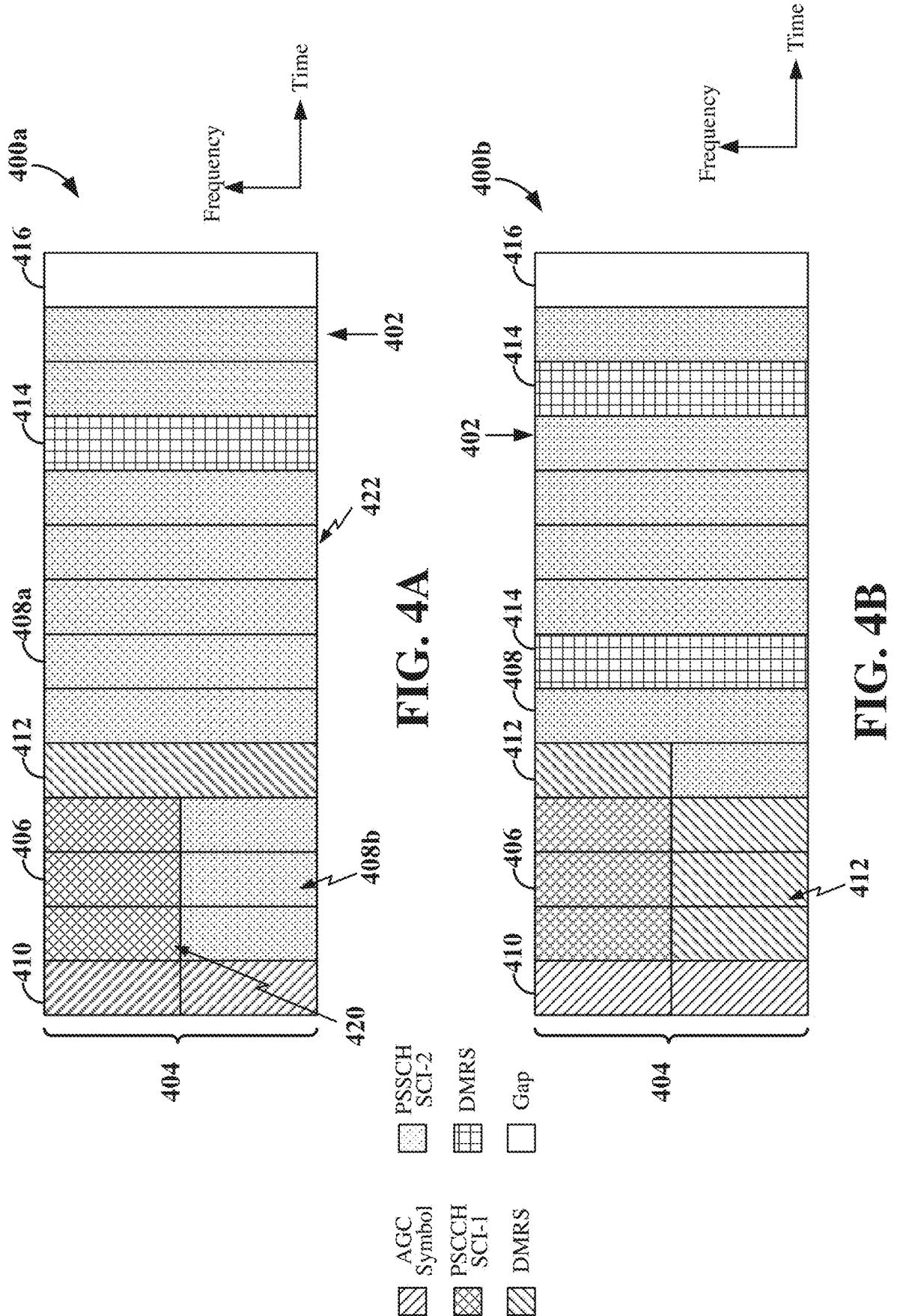
FIGS. 4A and 4B are diagrams illustrating examples of sidelink slot structures according to some aspects of the disclosure.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 10% to 100% of one sub-channel in the first two or three symbols). For example, the PSCCH 406 may occupy 10, 12, 15, 20, or 25 RBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400a as shown in FIG. 4A illustrates a two symbol DMRS pattern, while slot 400b as shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
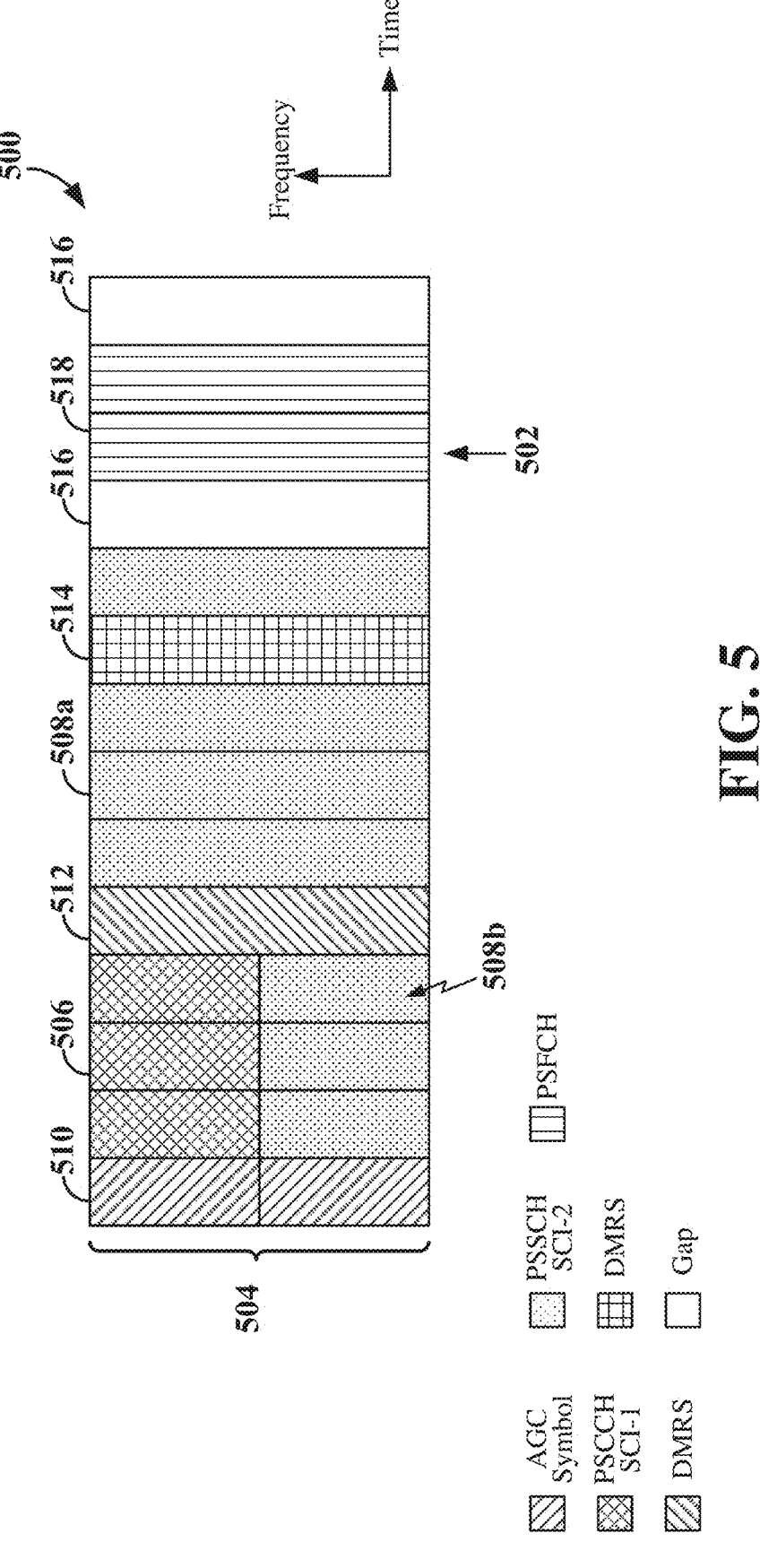
FIG. 5 is a diagram illustrating an example of a sidelink slot structure with feedback resources according to some aspects of the disclosure.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508*a* that is TDMed with the PSCCH 506 and a second portion 508*b* that is FDMed with the PSCCH 506.

The PSSCH 508 may further include a DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508*b* may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500*c*. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

The channels or carriers illustrated in FIGS. 1-5 are not necessarily all of the channels or carriers that may be utilized between devices, and those of ordinary skill in the art will recognize that other channels or carriers may be utilized in addition to those illustrated, such as other traffic, control, and feedback channels.

The radio protocol architecture for a radio access network, such as the radio access network 100 shown in FIG. 1, may take on various forms depending on the particular application. An example of a radio protocol architecture for the user and control planes is illustrated in FIG. 6.

Figure 6:
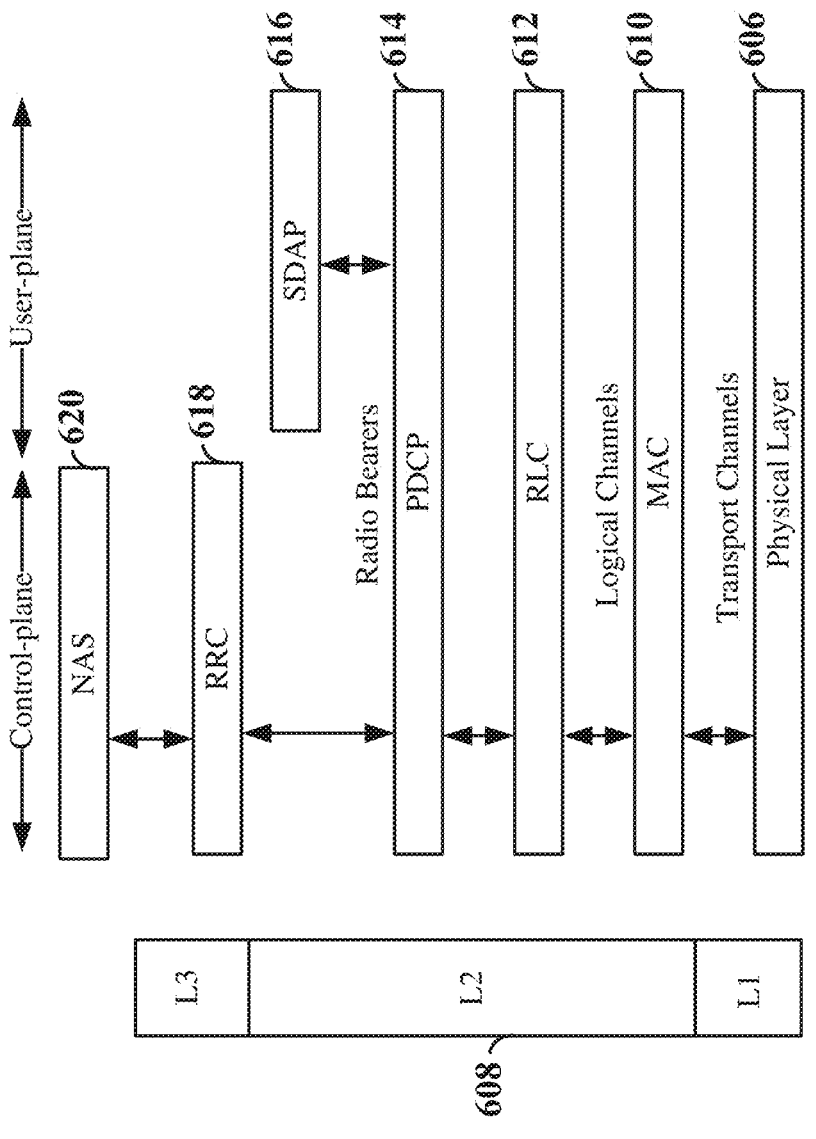
FIG. 6 is a diagram illustrating a radio protocol architecture for the user and control planes according to some aspects of the disclosure.

As illustrated in FIG. 6, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer 606. L2 608 is above the physical layer 606 and is responsible for the link between the UE and base station over the physical layer 606.

In the user plane, the L2 layer 608 includes a media access control (MAC) layer 610, a radio link control (RLC) layer 612, a packet data convergence protocol (PDCP) 614 layer, and a service data adaptation protocol (SDAP) layer 616, which are terminated at the base station on the network side. Although not shown, the UE may have several upper layers above the L2 layer 608 including at least one network layer (e.g., IP layer and user data protocol (UDP) layer) that is terminated at the User Plane Function (UPF) on the network side and one or more application layers.

The SDAP layer 616 provides a mapping between a 5G core (5GC) quality of service (QOS) flow and a data radio bearer and performs QoS flow ID marking in both downlink and uplink packets. The PDCP layer 614 provides packet sequence numbering, in-order delivery of packets, retransmission of PDCP protocol data units (PDUs), and transfer of upper layer data packets to lower layers. PDUs may include, for example, Internet Protocol (IP) packets, Ethernet frames and other unstructured data (i.e., Machine-Type Communication (MTC), hereinafter collectively referred to as "packets"). The PDCP layer 614 also provides header compression for upper layer data packets to reduce radio transmission overhead, security by ciphering the data packets, and integrity protection of data packets. A PDCP context may indicate whether PDCP duplication is utilized for a unicast connection.

The RLC layer 612 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 612. The MAC layer 610 provides multiplexing between logical and transport channels. The MAC layer 610 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 606 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 606 and L2 608 with the exception that there is no SDAP layer in the control plane and there is no header compression function for the control plane. The control plane also includes a radio resource control (RRC) layer 618 in L3 and a higher Non-Access Stratum (NAS) layer 620. The RRC layer 618 is responsible for establishing and configuring signaling radio bearers (SRBs) and data radio bearers (DRBs) between the base station and the UE, paging initiated by the 5GC or NG-RAN, and broadcast of system information related to Access Stratum (AS) and Non-Access Stratum (NAS). The RRC layer 618 is further responsible for OoS management, mobility management (e.g., handover, cell selection, inter-RAT mobility), UE measurement and reporting, and security functions. The NAS layer 620 is terminated at the AMF in the core network and performs various functions, such as authentication, registration management, and connection management.

In general, packets received by a sublayer from another sublayer may be referred to as Service Data Units (SDUs), while packets output from a sublayer to another sublayer may be referred to as Protocol Data Units (PDUs). For example, packets received by the PDCP sublayer 614 from an upper layer may be referred to as PDCP SDUs, and packets output from the PDCP sublayer 614 to the RLC sublayer may be referred to as PDCP PDUs or RLC SDUs.

Figures 7A, 7B:
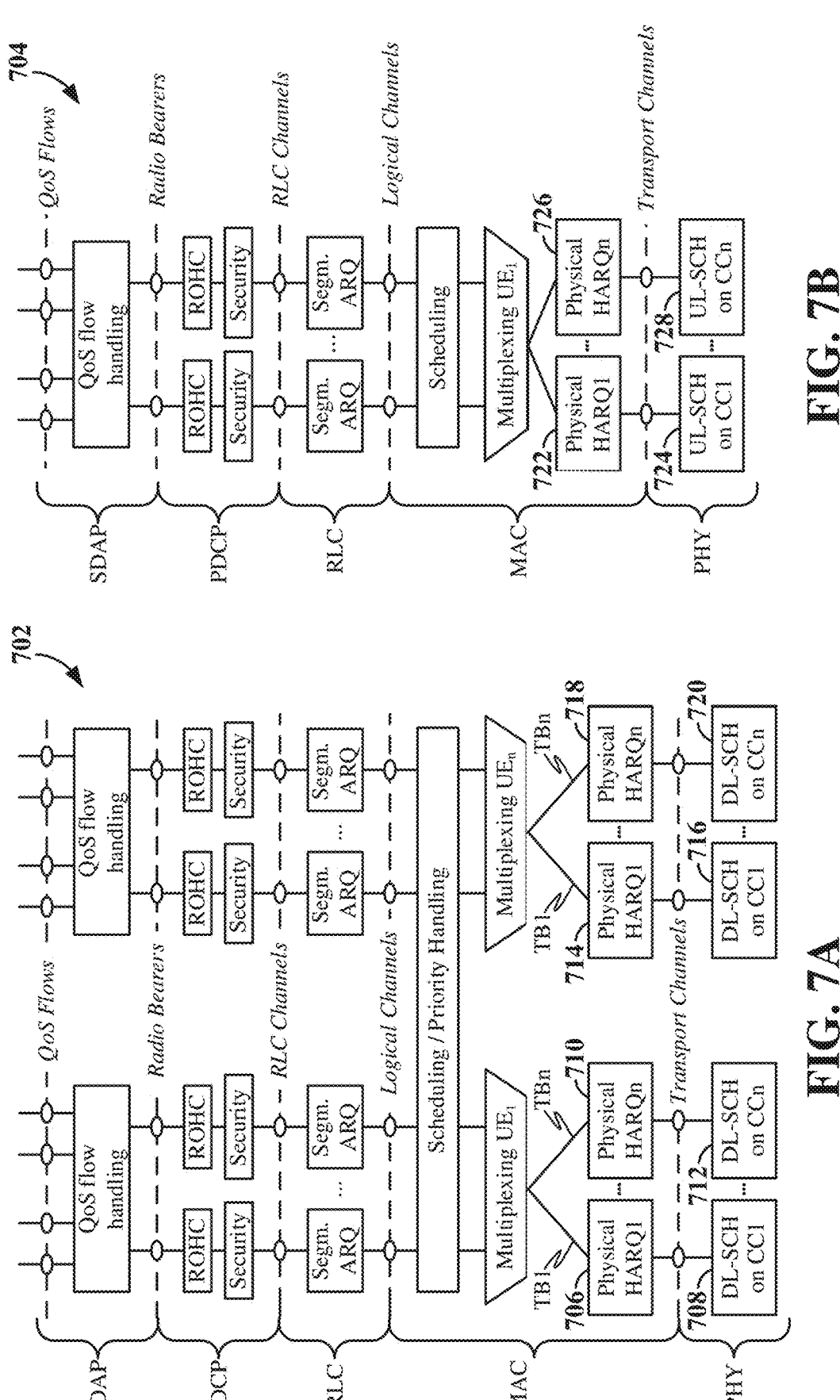
FIG. 7A is a block diagram of downlink Layer 1 and Layer 2 structures of a base station with carrier aggregation configured according to some aspects of the disclosure.
FIG. 7B is a block diagram of uplink Layer 1 and Layer 2 structures of a wireless communication device with carrier aggregation configured according to some aspects of the disclosure.

FIG. 7A is a block diagram of downlink Layer 1 and Layer 2 structures 702 of a base station with carrier aggregation configured according to some aspects of the disclosure. FIG. 7B is a block diagram of uplink Layer 1 and Layer 2 structures 704 of a wireless communication device (e.g., a UE) with carrier aggregation configured according to some aspects of the disclosure.

As described above, the services and functions of the MAC sublayer, as exemplified in FIGS. 6, 7A, and 7B, include: mapping between logical channels and transport channels; multiplexing/demultiplexing of MAC service data units (SDUs) belonging to one or different logical channels into/from transport blocks (TBs) delivered to/from the physical layer on transport channels; scheduling information reporting; error correction through HARQ (one HARQ entity per cell in case of carrier aggregation (CA)); priority handling between UEs using dynamic scheduling; priority handling between logical channels of one UE using logical channel prioritization; priority handling between overlapping resources of one UE; and padding. The MAC offers different kinds of data transfer services. Each logical channel type is defined by what type of information is transferred. Logical channels are classified into two groups: Control Channels and Traffic Channels. Control channels are used for the transfer of control plane information. Traffic channels are used for the transfer of user plane information.

The HARQ functionality ensures delivery between peer entities at Layer 1. For example, a Dedicated Traffic Channel (DTCH) (e.g., a point-to-point channel dedicated to one UE for the transfer of user information) can be mapped to its peer entity, a downlink-shared channel (DL-SCH). A DTCH can exist in both uplink and downlink. HARQ combines both Forward Error Correction (FEC) and Automatic Repeat Request (ARQ) to correct errors in received packets. FEC adds redundancy (parity bits) to the transmitted data to enable a certain amount of erroneously received bits to be corrected at the receiver. If a packet arrives having a higher number of errors than can be corrected using FEC, the ARQ process is initiated to request a retransmission of the packet from the sender. In general, HARQ uses a stop and wait (SAW) protocol, in which a transmitting entity waits to receive an acknowledged (ACK) or not acknowledged (NACK) back from the receiving entity before transmitting another packet or retransmitting the same packet. To fully utilize the bandwidth and increase throughput, multiple parallel HARQ processes may be initiated offset in time from one another. Each HARQ entity may maintain a number of parallel HARQ processes. Each HARQ entity may be identified by a unique HARQ entity identifier (ID). Each HARQ process may be identified by a unique HARQ process ID.

A single HARQ process supports one TB. In the examples described herein, a single HARQ entity, referred to herein as a "physical HARQ entity" supports one TB. Accordingly, references to a physical HARQ entity made herein may be understood as either a reference to the physical HARQ entity or a reference to a physical HARQ process maintained by the physical HARQ entity. Once a TB is associated with a physical HARQ entity (such as physical HARQ1 706 of FIG. 7A and physical HARQ1 722 of FIG. 7B), the same physical HARQ entity processes the initial transmission of the TB and all retransmissions of the TB. Furthermore, each physical HARQ entity is associated with one component carrier (CC). Therefore, if TB1 is associated with physical HARQ1 entity 706 and physical HARQ1 entity 706 is associated with a DL-SCH on CC1 708, then the initial transmission of TB1 and all retransmissions of TB1 on the DL-SCH will be carried by CC1. Therefore, a one-to-one-to-one relationship exists for all TB/physical HARQ entity/ CC combinations.

For the Layer 1 and Layer 2 downlink structure 702 of the base station of FIG. 7A, the plurality of channels of each UE (e.g., UE1 to UEx, where x is a positive integer) are multiplexed to a corresponding plurality of physical HARQ entities (e.g., physical HARQ entities HARQ1-HARQn, where n is a positive integer), as shown in FIG. 7A. For example, for UEx, if TB1 is associated with physical HARQ1 entity 714 and physical HARQ1 entity 714 is associated with a DL-SCH on CC1 716, then the initial transmission of TB1 and all retransmissions of TB1 will be carried by the DL-SCH on CC1 716. In other words, for example, for a set of 1 to n TBs (e.g., TB1-TBn), where n is a positive integer, if TBn is associated with physical HARQn entity 718 and physical HARQn entity 718 is associated with a DL-SCH on CCn 720, then the initial transmission of TBn and all retransmissions of TBn on the DL-SCH will be carried by the DL-SCH on CCn 720.

A similar result is reached for the Layer 1 and Layer 2 uplink structure 704 of the wireless communication device of FIG. 7B. If TB1 is associated with physical HARQ1 entity 722 and physical HARQ1 entity 722 is associated with a UL-SCH on CC1 724, then the initial transmission of TB1 and all retransmissions of TB1 on the UL-SCH will be carried by the UL-SCH on CC1 724. In other words, for a set of 1 to n TBs (e.g., TB1-TBn), where n is a positive integer, if TBn is associated with physical HARQn entity 726 and physical HARQn entity 726 is associated with UL-SCH on CCn 728, then the initial transmission of TBn and all retransmissions of TBn on the UL-SCH will be carried by the UL-SCH on CCn 728.

The one-to-one-to-one relationship between respective TBs, physical HARQ entities, and CCs may present undesirable delays in retransmissions of TBs. If, for example, TB1 was initially transmitted in association with physical HARQ1 706 via DL-SCH on CC1 708, but CC1 was temporarily unavailable for retransmission of TB1, then a receiver may need to wait for some predetermined time (e.g., a backoff time) until retransmission of TB1 on CC1 could take place.

Figure 8:
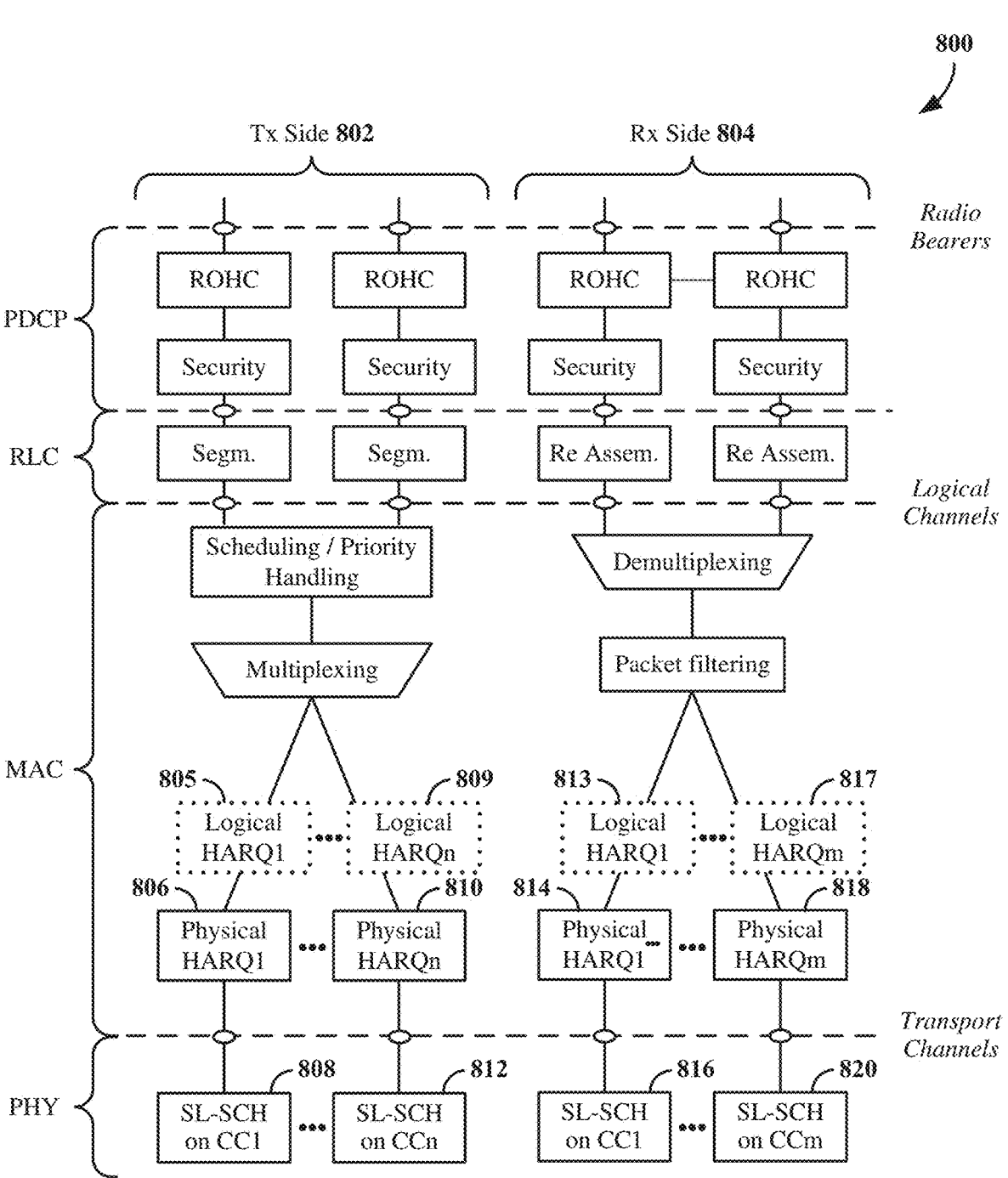
FIG. 8 is a block diagram of transmitting side and receiving side Layer 1 and Layer 2 structures of a sidelink wireless communication device with carrier aggregation configured, according to some aspects of the disclosure.

FIG. 8 is a block diagram of transmitting side 802 and receiving side 804 Layer 1 and Layer 2 structures of a sidelink wireless communication device 800 with carrier aggregation configured according to some aspects of the disclosure. The sidelink wireless communication device 800 may be, for example, the transmitting sidelink wireless communication device 1400 of FIG. 14 or 1900 of FIG. 19, or the receiving sidelink wireless communication device 1700 of FIG. 17.

The Layer 1 and Layer 2 sublayers of FIG. 8 are the same or similar to the Layer 1 and Layer 2 sublayers described above in connection with FIGS. 7A and 7B. In FIG. 8, only the MAC, RLC, and PDCP Layer 2 sublayers are presented to avoid cluttering the drawing. The description of these sublayers is the same as the description of the corresponding sublayers described above in connection with FIG. 7A and FIG. 7B and will not be repeated for the sake of brevity.

The services and functions of the MAC sublayer of FIG. 8 are the same or similar to the services and functions of the MAC sublayer described above in connection with FIG. 7A and FIG. 7B with the addition of one set of features. The common features between the previously described MAC sublayers of FIGS. 7A and 7B and the MAC sublayer of FIG. 8 will not be repeated for the sake of brevity. As illustrated, the additional features of the sidelink wireless communication device 800 of FIG. 8, in accordance with various aspects of the disclosure, include "logical" HARQ entities 805, 809, 813, 817. These logical HARQ entities 805, 809, 813, 817 may have similarities to, but are different from, and operate differently than, the physical HARQ entities 706, 710, 714, 718, 722, 726 of FIGS. 7A and 7B, for example.

The logical HARQ entities 805, 809, 813, 817 on the transmitting side 802 and the receiving side 804 of the sidelink wireless communication device 800 may be similar to the physical HARQ entities 706, 710, 714, 718, 722, 726 of FIG. 7A and FIG. 7B in that a single logical HARQ process supports one TB, and a single logical HARQ entity 805, 809, 813, 817 also supports one TB. Additionally, once a logical HARQ entity 805, 809, 813, 817 is associated with a TB, the initial transmission of the TB and all retransmissions of the TB are processed by the same logical HARQ entity 805, 809, 813, 817, respectively. However, unlike the physical HARQ entities 706, 710, 714, 718, each logical HARQ entity 805, 809, 813, 817 may be associated with one or more component carriers (CCs).

Therefore, for example, if TB1 is associated with logical HARQ1 entity 805, an initial transmission of TB1 on a SL-SCH on CC1 808 may be followed by a first transmit (TX) repetition (e.g., a retransmission) of TB1 on an SL-SCH on CCy (not shown) (where y is a positive integer not equal to 1) and may further be followed by a second TX repetition of TB1 on an SL-SCH on CCn 812 (where n is a positive integer that is not equal to 1 or y). Accordingly, the use of logical HARQ entities 805, 809, 813, 817 breaks the one-to-one-to-one relationship that exists for all TB/physical HARQ entity/CC combinations. The use of logical HARQ entities 805, 809, 813, 817 facilitates an association of one TB with one or more CCs. Because a logical HARQ entity 805, 809, 813, 817, associated with a first TB (TB1) may be associated with one or more CCs, a sidelink wireless communication device 800 may initially transmit TB1 on an SL-SCH on CC1. If retransmission is required but CC1 is unavailable, the sidelink wireless communication device 800 may determine if any other CC (e.g., CC2 through CCn) is available. If, for example, CCn 812 is available (when CC1 is unavailable), the sidelink wireless communication device 800 may retransmit TB1 on an SL-SCH on CCn 812 (different from SL-SCH on CC1 808). Providing alternate CCs for retransmission may, for example, reduce latency because the receiving sidelink wireless communication device may obtain the retransmission on an available CC, without having to wait for CC1 to again become available (e.g., without having to wait at least a backoff time between attempts to utilize CC1 for retransmission of TB1).

The same result is obtained for the Layer 1 and Layer 2 receive side 804 of FIG. 8. If TB1 is associated with logical HARQ1 entity 813 and logical HARQ1 entity 813 is first associated with an SL-SCH on CC1 816, then the initial transmission of TB1 may be received on the SL-SCH on CC1 816. If CC1 (e.g., the SL-SCH on CC1 816) is unavailable for retransmission of TB1, the sidelink wireless communication device 800 may determine that an SL-SCH on CCm 820 (where m is an integer greater than 1) is available for retransmission of TB1 and may retransmit TB1 on the SL-SCH on CCm 820.

There may be a mapping between logical and physical HARQ entities, but such a mapping is not required for one or more examples described herein. According to some aspects of the disclosure, the logical HARQ entities may exist separately from the physical HARQ entities; association between the logical and physical HARQ entities is not a prerequisite to any of the exemplary processes described herein.

Figure 9:
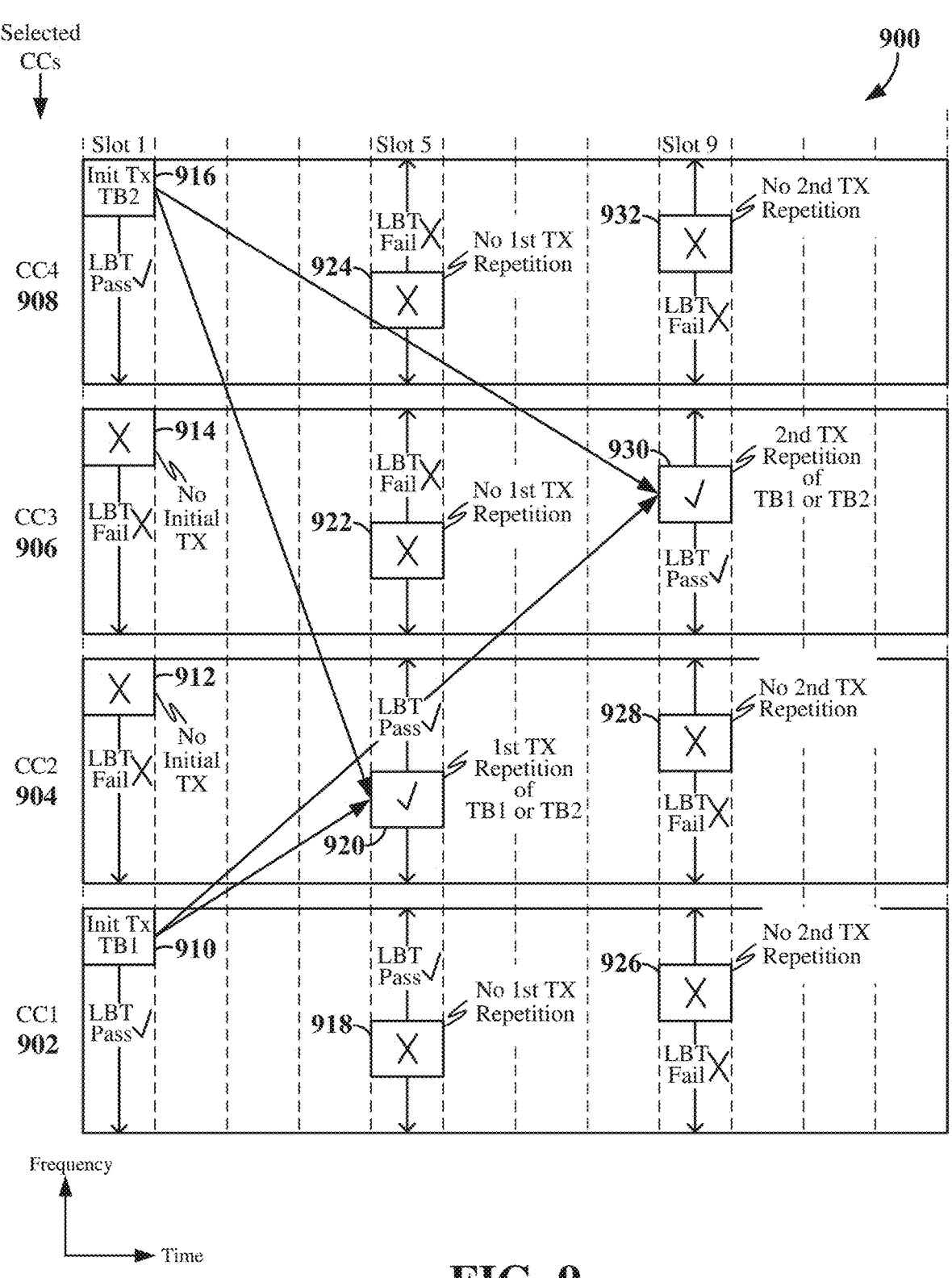
FIG. 9 is an orthogonal frequency divisional multiplexing (OFDM) resource grid illustrating four component carriers and twelve slots according to some aspects of the disclosure.

FIG. 9 is an orthogonal frequency divisional multiplexing (OFDM) resource grid 900 illustrating four component carriers 902, 904, 906, 908 and twelve slots according to some aspects of the disclosure. Carrier aggregation is enabled, hence there are an exemplary four component carriers depicted. A sidelink wireless communication device may perform a listen before talk (LBT) process before transmission in a slot on each component carrier. If there is no detected use of the component carrier (e.g., LBT pass), the sidelink wireless communication device may transmit a TB on the component carrier. If there is a detected use of the component carrier (e.g., LBT fail), the sidelink wireless communication device may wait for a predetermined amount of time (e.g., a backoff time) before performing the LBT process on the component carrier again.

In the example of FIG. 9, an LBT pass has been obtained for CC1 902 and CC4 908. An LBT fail has been obtained for CC2 904 and CC3 906. Therefore, the sidelink wireless communication device may perform an initial transmission of a first TB (TB1) 910 on CC1 902 in slot 1 and perform an initial transmission of a second TB (TB2) 916 on CC4 908 in slot 1. No initial transmission 912, 914 occurs on CC2 904 or CC3 906. A first retransmission of TB1 and/or TB2 is scheduled for slot 5, while a second retransmission of TB1 and/or TB2 is scheduled for slot 9.

The sidelink wireless communication device performs a second LBT process before transmitting during slot five. An LBT fail is obtained for CC1 902, CC3 906, and CC4 908. An LBT pass is obtained for CC2 904. For TBs mapped to physical HARQ entities, an initial transmission of TB1 on CC1 902 would mean that the retransmission of TB1 should occur on CC1 902. However, for TBs mapped to logical HARQ entities, an initial transmission of TB1 on CC1 902 may mean that the retransmission of TB1 may be cross-carrier scheduled on CC2 904, CC3 906, or CC4 908. Of those three component carriers at slot five, only CC2 904 has received an LBT pass. According to aspects described herein, the sidelink wireless communication device may utilize cross-carrier scheduling to perform a first TX repetition 920 (e.g., a retransmission) of TB1 on CC2 904 during slot five.

Similarly, an LBT fail is obtained for CC4 908 at slot five. For TBs mapped to physical HARQ entities, an initial transmission of TB2 on CC4 908 would mean that the retransmission of TB2 should occur on CC4 908. However, for TBs mapped to logical HARQ entities, an initial transmission of TB2 on CC4 908 may mean that the retransmission of TB2 may be cross-carrier scheduled on CC1 902, CC2 904, or CC3 906. Of those three component carriers at slot five, only CC2 904 has received an LBT pass. According to aspects described herein, the sidelink wireless communication device may utilize cross-carrier scheduling to perform a first TX repetition 920 (e.g., a retransmission) of TB2 on CC2 904 during slot 5. First TX repetitions 918, 922, 924 on CC1 902, CC3 906, and CC4 908 are unavailable because of the LBT fails obtained for those component carriers at slot 5.

Only TB1 or TB2 may be retransmitted on CC2 904 at slot five. The selection of which TB to retransmit may depend on several factors. The evaluation of those factors is outside of the scope of this disclosure.

The sidelink wireless communication device may perform a third LBT process before transmitting in slot 9. An LBT fail is obtained for CC1 902, CC2 904, and CC4 908. An LBT pass is obtained for CC3 906. For TBs mapped to physical HARQ entities, an initial transmission of TB1 on CC1 902 would mean that the retransmission of TB1 should occur on CC1 902. However, for TBs mapped to logical HARQ entities, an initial transmission of TB1 on CC1 902 may mean that the retransmission of TB1 may be cross-carrier scheduled on CC2 904, CC3 906, or CC4 908. Of those three component carriers at slot nine, only CC3 906 received an LBT pass. According to aspects described herein, the sidelink wireless communication device may utilize cross-carrier scheduling to perform a second TX repetition 930 (e.g., a retransmission) of TB1 on CC3 906 during slot nine.

Similarly, an LBT fail is obtained for CC4 908 at slot nine. For TBs mapped to physical HARQ entities, an initial transmission of TB2 on CC4 908 would mean that the retransmission of TB2 should occur on CC4 908. However, for TBs mapped to logical HARQ entities, an initial transmission of TB2 on CC4 908 may mean that the retransmission of TB2 may be cross-carrier scheduled on CC1 902, CC2 904, or CC3 906. Of those three component carriers at slot nine, only CC3 906 has received an LBT pass. According to aspects described herein, the sidelink wireless communication device may utilize cross-carrier scheduling to perform a second TX repetition 930 (e.g., a retransmission) of TB2 on CC3 906 during slot 9. Second TX repetitions 926, 928, 932 on CC1 902, CC2 904, and CC4 908 are unavailable because of the LBT fails obtained for those component carriers at slot 9.

As before, only TB1 or TB2 may be retransmitted on CC3 906 at slot nine. The selection of which TB to retransmit may depend on several factors. The evaluation of those factors is outside of the scope of this disclosure.

Figure 10:
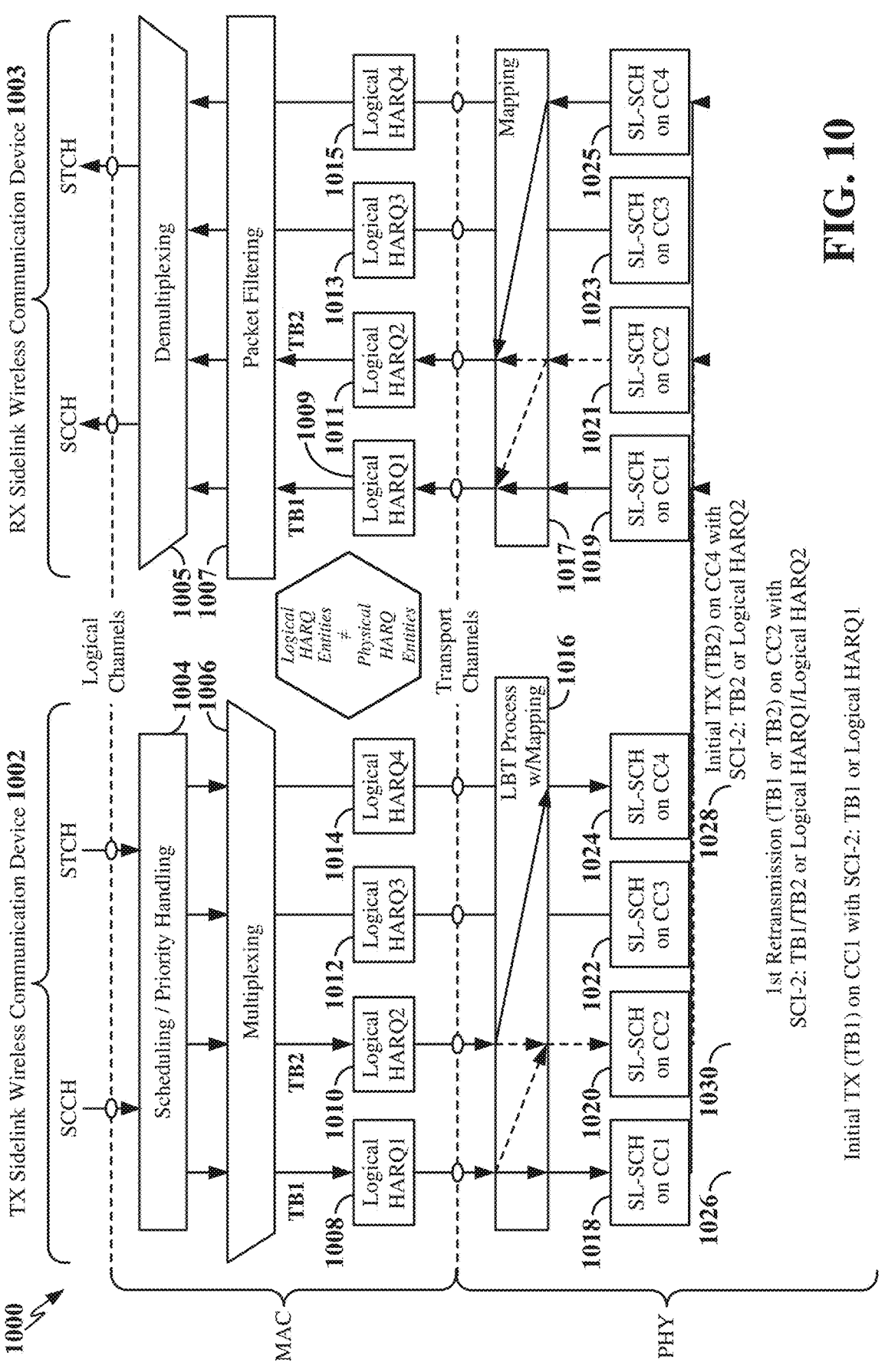
FIG. 10 is a block diagram of the Layer 1 and Layer 2 structures of a pair of a transmitting sidelink wireless communication device and a receiving sidelink wireless communication device with carrier aggregation configured, according to some aspects of the disclosure.

FIG. 10 is a block diagram 1000 of the Layer 1 and Layer 2 structures of a pair of a transmitting sidelink wireless communication device 1002 and a receiving sidelink wireless communication device 1003, with carrier aggregation configured, according to some aspects of the disclosure. FIG. 10 exemplifies cross-carrier retransmission in an unlicensed intra-band or inter-band operation. The transmitting sidelink wireless communication device 1002 and the receiving sidelink wireless communication device 1003 may be exemplified by the transmitting sidelink wireless communication device 1400 of FIG. 14 or 1900 of FIG. 19 or the receiving sidelink wireless communication device 1700 of FIG. 17.

The Layer 1 and Layer 2 sublayers of FIG. 10 are the same or similar to the Layer 1 and Layer 2 sublayers described above in connection with FIGS. 7A and 7B. In FIG. 10, only the PHY and MAC sublayers are presented to avoid cluttering the drawing. The description of these sublayers is the same as the description of the corresponding sublayers described above in connection with FIG. 7A and FIG. 7B and will not be repeated for the sake of brevity.

The services and functions of the MAC sublayer of FIG. 10 are the same or similar to the services and functions of the MAC sublayer described above in connection with FIG. 7A and FIG. 7B with the addition of a first plurality of logical HARQ entities (e.g., logical HARQ entity 1008 HARQ1, logical HARQ entity 1010 HARQ2, logical HARQ entity 1012 HARQ3, and logical HARQ entity 1014 HARQ4) on the transmitting sidelink wireless communication device 1002 and a second plurality of logical HARQ entities (e.g., logical HARQ entity 1009 HARQ1, logical HARQ entity 1011 HARQ2, logical HARQ entity 1013 HARQ3, and logical HARQ entity 1015 HARQ4) on the receiving sidelink wireless communication device 1003. Physical HARQ entities are omitted to avoid cluttering the drawing.

The logical HARQ entities 1008, 1010, 1012, 1014, 1009, 1011, 1013, 1015 are different from, and operate differently than, the physical HARQ entities 706, 710, 714, 718, 722, 726 of FIG. 7A and FIG. 7B, for example. The logical HARQ entities 1008, 1010, 1012, 1014 on the transmitting sidelink wireless communication device 1002, and the logical HARQ entities 1009, 1011, 1013, 1015 on the receiving sidelink wireless communication device 1003 may be similar to the physical HARQ entities 706, 710, 714, 718, 722, 726 of FIG. 7A and FIG. 7B in that a single logical HARQ process supports one TB, and a single logical HARQ entity 1008, 1010, 1012, 1014, 1009, 1011, 1013, 1015 also supports one TB. Additionally, once a logical HARQ entity 1008, 1010, 1012, 1014, 1009, 1011, 1013, 1015 is associated with a TB, the initial transmission of the TB and all retransmissions of the TB are processed by the same logical HARQ entity 1008, 1010, 1012, 1014, 1009, 1011, 1013, 1015, respectively. However, unlike the physical HARQ entities 706, 710, 714, 718, 722, 726, each logical HARQ entity 1008, 1010, 1012, 1014, 1009, 1011, 1013, 1015 may be associated with one or more component carrier (CCs).

The transmitting sidelink wireless communication device 1002 may be configured with an LBT process with mapping feature 1016, and the receiving sidelink wireless communication device 1003 may be configured with a mapping feature 1017 (e.g., a mapping process). Both features 1016 and 1017 are depicted in the PHY layer; however, the features could be in either the PHY or the MAC layer or be distributed in both the PHY layer and the MAC layer. The LBT process with mapping feature 1016 may perform an LBT process on each component carrier (e.g., for a given slot) and may map a given TB to a component carrier that has an LBT passed state, without regard to whether an initial transmission of the TB was carried by the component carrier that has the LBT passed state.

For example, logical HARQ entity 1008 HARQ1 is associated with TB1, and logical HARQ 1010 HARQ2 is associated with TB2. The LBT processing with mapping feature 1016 may perform an LBT process on CC1, CC2, CC3, and CC4 prior to the initial transmission of TB1 and TB2 on respective component carriers. In the example of FIG. 10, an LBT pass result is obtained for the SL-SCH on CC1 1018 and the SL-SCH on CC4 1024. An initial transmission 1026 of TB1 is associated with logical HARQ entity 1008 HARQ1 and transmitted over the SL-SCH on CC1 1018. An initial transmission 1028 of TB2 is associated with logical HARQ 1010 HARQ2 and transmitted over the SL-SCH on CC4 1024 (not the SL-SCH on CC2 1020). To inform the mapping feature 1017 of the receiving sidelink wireless communication device 1003 of the mapping of TB1, the SL-SCH may be transmitted with a first sidelink control information stage 2 (e.g., an SCI-2, a second stage SCI), which may associate the TB associated with the SL-SCH on CC1 1019 received at the receiving sidelink wireless communication device 1003 with either a TB index number associated with TB1 or a logical HARQ1 entity index number (or identifier). To inform the mapping feature 1017 on the receiving sidelink wireless communication device 1003 of the mapping of TB2, the SL-SCH may be transmitted with a second SCI-2, which may associate the TB associated with the SL-SCH on CC4 1025 received at the receiving sidelink wireless communication device 1003 with either a TB index number associated with TB2 or a logical HARQ2 entity index number (or identifier). With the information from the SCI-2*s*, the mapping feature 1017 may be able to map the TB on the SL-SCH on CC1 1019 to the logical HARQ 1009 HARQ1 (e.g., identified by a first logical HARQ entity index number or identifier) and map the TB on SL-SCH on CC4 1025 to the logical HARQ 1011 HARQ2 (e.g., identified by a second logical HARQ entity index number or identifier).

In the example of FIG. 10, the LBT processing with mapping feature 1016 may perform an LBT process on CC1, CC2, CC3, and CC4 prior to a first retransmission of TB1 or TB2 on respective component carriers. In the example of FIG. 10, an LBT pass result for the first retransmission in a given slot is obtained for the SL-SCH on CC2 1020. LBT fail results for the first retransmission in the given slot are obtained for the SL-SCH on CC1 1018, SL-SCH on CC3 1022, and SL-SCH on CC4 1024. The initial transmission and the first retransmission of TB1 are associated with logical HARQ entity 1008 HARQ1, and the initial transmission and the first retransmission of TB2 are associated with logical HARQ 1010 HARQ2. Selection of which transport block (TB1 or TB2) has priority for retransmission on the SL-SCH on CC2 1020 may be performed according to processes known to those of skill in the art. Once a determination is made as to whether to retransmit TB1 or TB2 (given that only CC2 has an LBT pass result), the transmitting sidelink wireless communication device 1002 may perform the first retransmission 1030 of TB1 or TB2 over the SL-SCH on CC2 1020. To inform the mapping feature 1017 on the receiving sidelink wireless communication device 1003 of the mapping of TB1 or TB2 to the SL-SCH on CC2 1020, the SL-SCH may be transmitted with a third SCI-2, which may associate the TB associated with the SL-SCH on CC2 1021 received at the receiving sidelink wireless communication device 1003 with either the TB index number associated with the selected TB (e.g., either TB1 or TB2) or a logical HARQ1/logical HARQ2 entity index number associated with the selected TB (e.g., either TB1 or TB2). With the information from the third SCI-2, the mapping feature 1017 may be able to map the TB associated with the SL-SCH on CC2 1021 to either the logical HARQ 1009 HARQ1 or the logical HARQ 1011 HARQ2 (depending on whether TB1 or TB2 was selected and retransmitted).

According to some aspects, FIG. 10 may exemplify a method of cross-carrier retransmission in a wireless communication network at a transmitting sidelink wireless communication device 1002. For example, the transmitting sidelink wireless communication device 1002 may assign a transport block (TB) to a logical hybrid automatic repeat request (HARQ) entity, map the TB to an available component carrier in a plurality of component carriers, and transmit the TB to the receiving sidelink wireless communication device 1003 on the available component carrier. The TB may be associated with a first sidelink control information (SCI) that cross-references the TB to the logical HARQ entity. The transmitting sidelink wireless communication device 1002 may further map the TB to a different available component carrier in the plurality of component carriers for retransmission of the TB on the different available component carrier and retransmit the TB on the different available component carrier, the retransmitted TB being associated with a second SCI that cross-references the retransmitted TB to the logical HARQ entity.

According to some aspects, FIG. 10 may also exemplify a method of cross-carrier retransmission in a wireless communication network at a receiving sidelink wireless communication device 1003. For example, the receiving sidelink wireless communication device 1003 may detect a TB transmitted from the transmitting sidelink wireless communication device 1002, on a first component carrier of a plurality of component carriers, the TB being associated with the first sidelink control information (SCI) that cross-references the TB to at least one of the TB index number or the logical hybrid automatic repeat request (HARQ) entity index number and map the TB to the logical HARQ entity corresponding to the at least one of the TB index number or the logical HARQ entity index number. The receiving sidelink wireless communication device 1003 may further detect a retransmission of the TB on a second component carrier of the plurality of component carriers, the second component carrier being different from the first component carrier, the retransmission of the TB being associated with a second SCI that cross-references the retransmitted TB to at least one of the TB index number or the logical HARQ entity index number, and map the retransmission of the TB to the logical HARQ entity corresponding to the at least one of the TB index number or the logical HARQ entity index number.

There may be a mapping between logical and physical HARQ entities, but such a mapping is not required for one or more examples described herein. According to some aspects of the disclosure, the logical HARQ entities may exist separately from the physical HARQ entities; association between the logical and physical HARQ entities is not a prerequisite to any of the exemplary processes described herein.

Figure 11:
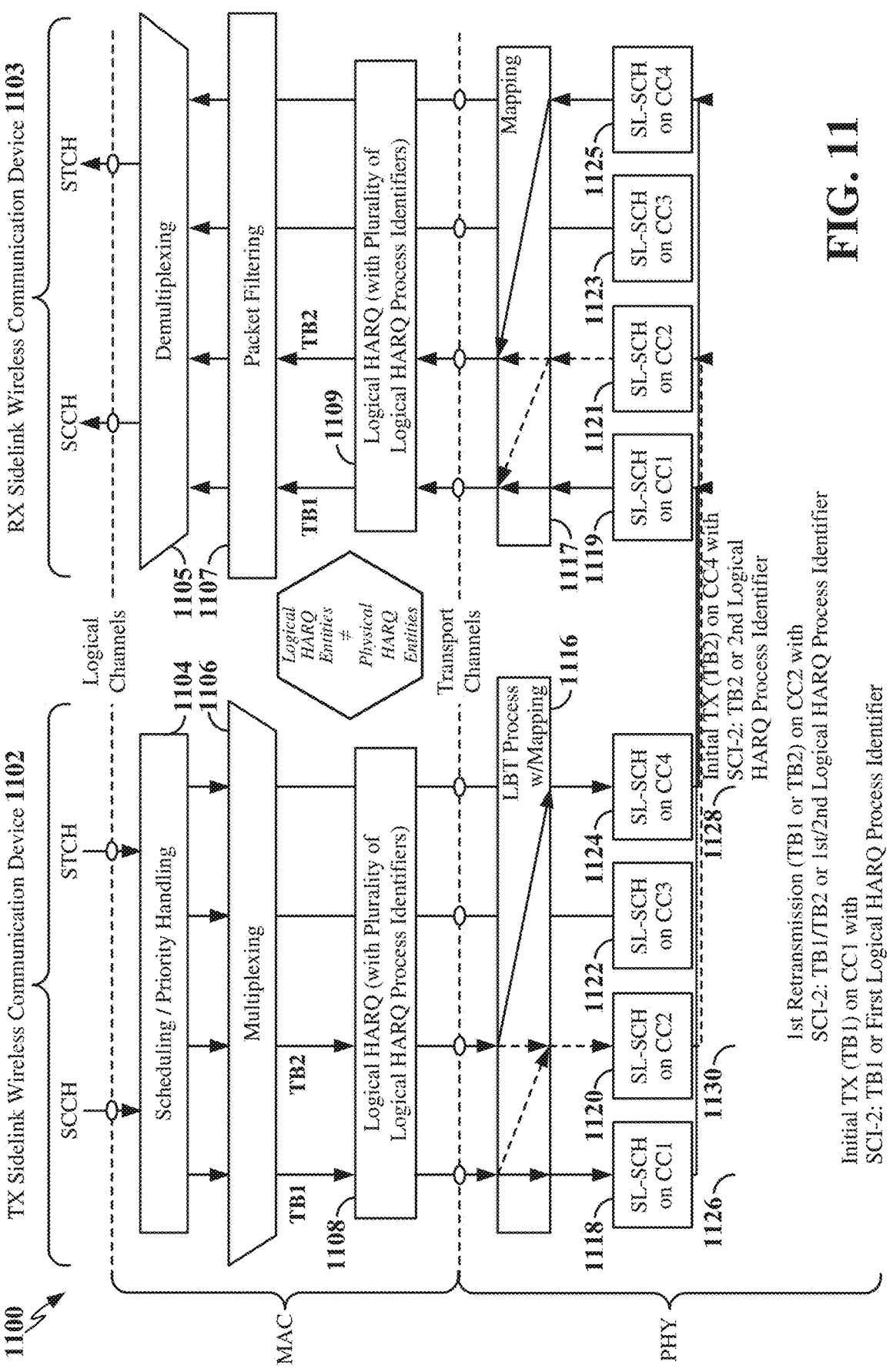
FIG. 11 is a block diagram of the Layer 1 and Layer 2 structures of a pair of a transmitting sidelink wireless communication device and a receiving sidelink wireless communication device with carrier aggregation configured, according to some aspects of the disclosure.

FIG. 11 is a block diagram of the Layer 1 and Layer 2 structures of a pair of a transmitting sidelink wireless communication device 1102 and a receiving sidelink wireless communication device 1103 with carrier aggregation configured, according to some aspects of the disclosure. FIG. 11 exemplifies cross-carrier retransmission in an unlicensed intra-band operation. The transmitting sidelink wireless communication device 1102 and the receiving sidelink wireless communication device 1103 may be exemplified by the transmitting sidelink wireless communication device 1400 of FIG. 14 or 1900 of FIG. 19, and the receiving sidelink wireless communication device 1700 of FIG. 17, respectively.

The Layer 1 and Layer 2 sublayers of FIG. 11 are the same or similar to the Layer 1 and Layer 2 sublayers described above in connection with FIGS. 7A and 7B. In FIG. 11, only the PHY and MAC sublayers are presented to avoid cluttering the drawing. The description of these sublayers is the same as the description of the corresponding sublayers described above in connection with FIG. 7A and FIG. 7B and will not be repeated for the sake of brevity.

The services and functions of the MAC sublayer of FIG. 11 are the same or similar to the services and functions of the MAC sublayer described above in connection with FIG. 7A and FIG. 7B with the addition of one logical HARQ entity 1108 on the transmitting sidelink wireless communication device 1102 and one logical HARQ entity 1109 on the receiving sidelink wireless communication device 1103. Physical HARQ entities are omitted to avoid cluttering the drawing. The one logical HARQ entity 1108 on the transmitting side and the one logical HARQ entity 1109 on the receiving side each perform HARQ processes on all respective transport blocks on their respective sides. For example, both TB1 and TB2 are associated with logical HARQ entity 1108 on the transmitting sidelink wireless communication device 1102 and are associated with logical HARQ entity 1109 on the receiving sidelink wireless communication device 1103. In other words, in the example of FIG. 11, there is no one-to-one relationship between respective HARQ entities and TBs. To keep order among the plurality of TBs associated with the logical HARQ entities 1108, 1109, each TB may be associated with a unique logical HARQ process identifier.

As with FIG. 10, the logical HARQ entities 1108, 1109 are different from, and operate differently than the physical HARQ entities 706, 710, 714, 718, 722, 726 of FIG. 7A and FIG. 7B, for example. The logical HARQ entity 1108 on the transmitting sidelink wireless communication device 1102, and the logical HARQ entity 1109 on the receiving sidelink wireless communication device 1103 may be different from the physical HARQ entities 706, 710, 714, 718, 722, 726 of FIG. 7A and FIG. 7B in that each logical HARQ entity 1108, 1109 may be associated with a plurality of TBs (e.g., no one logical HARQ entity 1108, 1109 supports one TB in a one-to-one relationship). Additionally, unlike the physical HARQ entities 706, 710, 714, 718, 722, 726 of FIG. 7A and FIG. 7B, each logical HARQ entity 1108, 1109 may be associated with one or more component carriers (CCs).

As with FIG. 10, the transmitting sidelink wireless communication device 1102 may be configured with an LBT process with mapping feature 1116, and the receiving sidelink wireless communication device 1103 may be configured with a mapping feature 1117 (e.g., a mapping process). Both features 1116 and 1117 are depicted in the PHY layer; however, the features could be in either the PHY or the MAC layer or be distributed in both the PHY layer and the MAC layer. The LBT process with mapping feature 1116 may perform an LBT process on each component carrier (e.g., for a given slot) and may map a given TB to a component carrier (associated with a logical HARQ entity process identifier) that has an LBT passed state, without regard to whether an initial transmission of the TB was carried by the component carrier that has the LBT passed state.

For example, logical HARQ 1108 is associated with TB1 and TB2; however, a first logical HARQ process identifier (e.g., a first one of a plurality of logical HARQ process identifiers) is associated with TB1, and a second logical HARQ process identifier (e.g., a second one of the plurality of logical HARQ process identifiers) is associated with TB2. The LBT processing with mapping feature 1116 may perform an LBT process on CC1, CC2, CC3, and CC4 prior to the initial transmission of TB1 and TB2 on respective component carriers. In the example of FIG. 11, an LBT pass result is obtained for the SL-SCH on CC1 1118 and the SL-SCH on CC4 1124. An initial transmission 1126 of TB1 is associated with logical HARQ 1108 and the first logical HARQ process identifier of the plurality of logical HARQ process identifiers and transmitted over the SL-SCH on CC1 1118. An initial transmission of TB2 is associated with logical HARQ 1108 and the second logical HARQ process identifier of the plurality of logical HARQ process identifiers and transmitted over the SL-SCH on CC4 1124 (not the SL-SCH on CC2 1120). To inform the mapping feature 1117 of the receiving sidelink wireless communication device 1103 of the mapping of TB1, the SL-SCH may be transmitted with a first sidelink control information stage 2 (e.g., an SCI-2, a second stage SCI), which may associate the TB associated with the SL-SCH on CC1 1119 received at the receiving sidelink wireless communication device 1103 with either a TB index number associates with TB1 or a logical HARQ entity process identifier (e.g., the first logical HARQ process identifier). To inform the mapping feature 1117 on the receiving sidelink wireless communication device 1103 of the mapping of TB2, the SL-SCH may be transmitted with a second SCI-2, which may associate the TB associated with the SL-SCH on CC4 1125 received at the receiving sidelink wireless communication device 1103 with either a TB index number associated with TB2 or a logical HARQ entity process identifier (e.g., second logical HARQ process identifier). With the information from the SCI-2s, the mapping feature 1117 may be able to map the TB on the SL-SCH on CC1 1119 to the first logical HARQ process identifier of the logical HARQ 1109 and map the TB on the SL-SCH on CC4 1125 to the second logical HARQ process identifier of the logical HARQ 1109.

In the example of FIG. 11, the LBT processing with mapping feature 1116 may perform an LBT process on CC1, CC2, CC3, and CC4 prior to a first retransmission of TB1 or TB2 on respective component carriers. In the example of FIG. 11, an LBT pass result for the retransmission in a given slot is obtained for SL-SCH on CC2 1120. LBT fail results for the first retransmission in the given slot are obtained for the SL-SCH on CC1 1118, SL-SCH on CC3 1122, and SL-SCH on CC4 1124. The initial transmission and the first retransmission of TB1 are associated with the first logical HARQ process identifier of the logical HARQ 1108, and the initial transmission and the first retransmission of TB2 are associated with the second logical HARQ process identifier of the logical HARQ 1108. Selection of which transport block (TB1 or TB2) has priority for retransmission on the SL-SCH on CC2 1120 may be performed according to processes known to those of skill in the art. Once a determination is made as to whether to retransmit TB1 or TB2 (given that only CC2 has an LBT pass result), the transmitting sidelink wireless communication device 1102 may perform the first retransmission of TB1 or TB2 over the SL-SCH on CC2 1120. To inform the mapping feature 1117 on the receiving sidelink wireless communication device 1103 of the mapping of TB1 or TB2 to the SL-SCH on CC2 1120, the SL-SCH may be transmitted with a third SCI-2, which may associate the TB associated with the SL-SCH on CC2 1121 received at the receiving sidelink wireless communication device 1103 with either the TB index number associated with the selected TB (e.g., either TB1 or TB2) or a logical HARQ1/logical HARQ2 process identifier (e.g., first or second logical HARQ process identifier) associated with the selected TB (e.g., either TB1 or TB2). With the information from the third SCI-2, the mapping feature 1117 may be able to map the TB associated with the SL-SCH on CC2 1121 to either the first logical HARQ process identifier or the second logical HARQ process identifier of the logical HARQ 1109 (depending on whether TB1 or TB2 was retransmitted).

There may be a mapping between logical and physical HARQ entities, but such a mapping is not required for one or more examples described herein. According to some aspects of the disclosure, the logical HARQ entities may exist separately from the physical HARQ entities; association between the logical and physical HARQ entities is not a prerequisite to any of the exemplary processes described herein.

Figure 12:
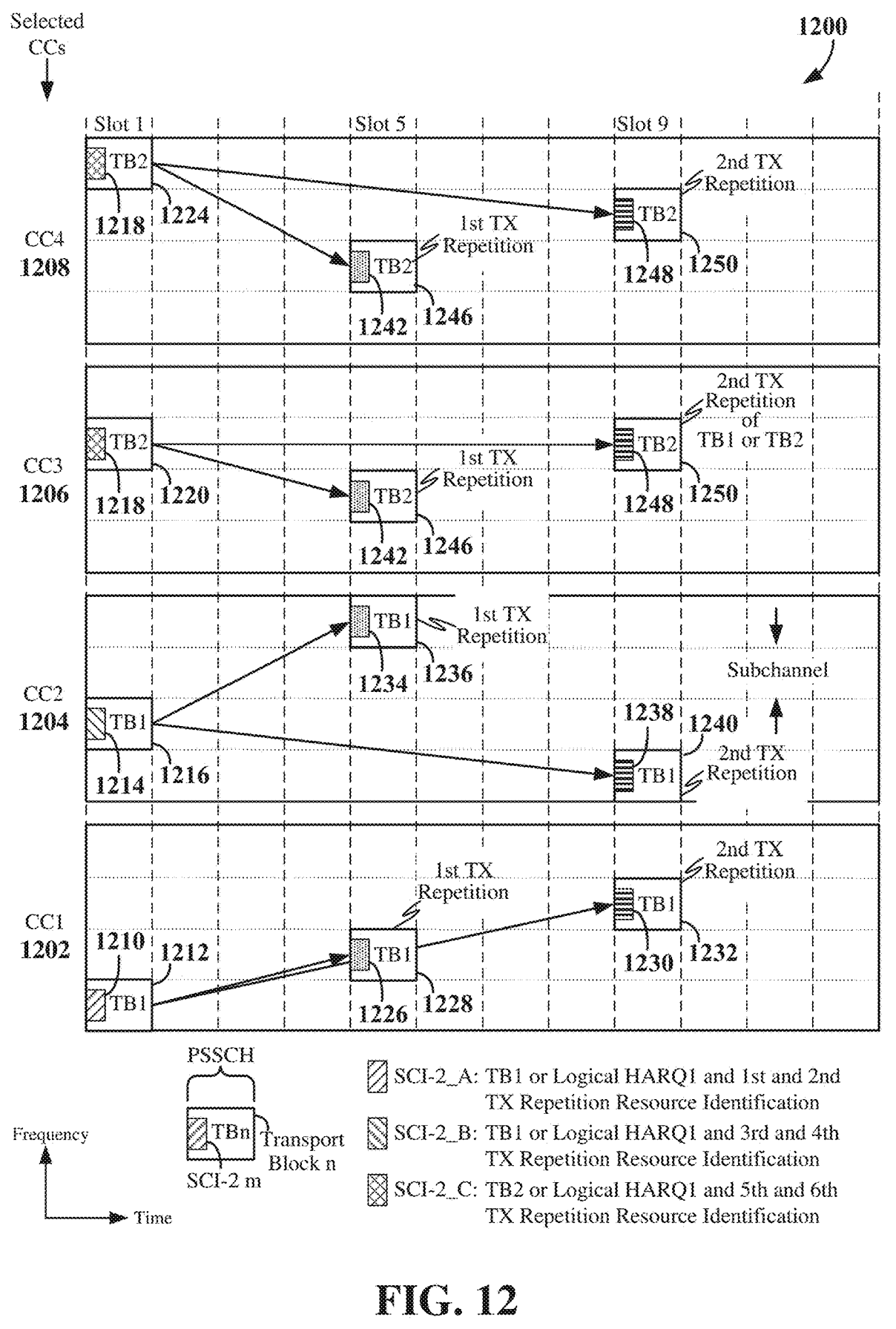

FIG. 12 is an orthogonal frequency divisional multiplexing (OFDM) resource grid 1200 illustrating four component carriers 1202, 1204, 1206, 1208 and twelve slots according to some aspects of the disclosure. Cross-carrier retransmission of packets having the same transport block data with different SCIs for unlicensed operations is illustrated. Carrier aggregation is enabled. The items illustrated in FIG. 12 correspond to PSSCHs carrying TBs with SCI-2s embedded within each PSSCH.

According to one aspect, a transmitting sidelink wireless communication device may generate one or more packets, each including a respective transport block (TB) and a respective sidelink control information (SCI) indicating a respective component carrier (or resource) of one or more component carriers (or resources) designated for TB retransmission. The sidelink wireless communication device may perform a respective listen before talk (LBT) process on one or more component carriers (or resources). The sidelink wireless communication device may then transmit a selected packet of the one or more packets on a component carrier (or resource) of the one or more component carriers (or resources) based on the LBT processes.

In other words, one or more PSSCH packets, each having the same TB and the same or different SCI, may be generated in advance (e.g., in advance of a call for such PSSCH packets, for instance, following the obtaining of an LBT pass indicative of an availability of a component carrier or resource utilized for transport of one or more of the packets). Each different SCI may identify a different resource for a first retransmission of the TB and a second retransmission of the TB, for example. The one or more PSSCH packets may be pre-prepared in advance (e.g., pre-generated in advance) so that as soon as an opportunity to send any given one of the pre-prepared PSSCH packets arises, the PSSCH packet may be transmitted. Pre-preparing the one or more PSSCH packets reduces the processing time in preparing the PSSCH packets following obtaining an LBT pass (or otherwise obtaining a call for the PSSCH packets) on any given component carrier or resource.

According to some aspects, the one or more packets may include a single packet generated for use on any of the one or more component carriers (or resources), and the respective SCI associated with the single packet may indicate a single component carrier (or resource) of the one or more component carriers (or resources) designated for TB retransmission. In this case, the sidelink wireless communication device may further transmit the single packet as the selected packet on any single component carrier (or resource) of the one or more component carriers (or resources) associated with a successful LBT process.

For example, in FIG. 12, the single packet generated for use on any of the one or more component carriers may be the PSSCH packet that corresponds to both PSSCH packet 1220 and 1224 in CC3 1206 and CC4 1208, respectively. The single PSSCH packet includes one SCI-2 1218 that may indicate that a first transmission repetition of TB2 may occur on a first set of resources (corresponding to PSSCH 1246 with its own SCI-2 1242) in both CC3 1206 and CC4 1208 and a second transmission repetition of TB2 may occur on a second set of resources (corresponding to PSSCH 1248 with its own SCI-2 1250) in both CC3 1206 and CC4 1208. In this case, the sidelink wireless communication device may transmit the one packet as the PSSCH packet 1220 on CC3 1206 or as the PSSCH packet 1224 on CC4 1208, depending, for example, on whether CC3 1206 or CC4 1208 obtained an LBT pass. The transmitted PSSCH packet may identify a TB index number or a logical HARQ entity index number index number/logical HARQ process identifier associated with the transmitted TB (e.g., as explained in connection with FIG. 10 and/or FIG. 11).

According to some aspects, and as exemplified in FIG. 12 in connection with CC1 1208 and CC2 1204, the one or more packets may include a plurality of packets (e.g., first PSSCH packets 1212 and second PSSCH packets 1216) each generated for use on any of the one or more component carriers (e.g., CC1 1202 and CC2 1204) (or any one or more resources), and each having a respective SCI (e.g., SCI-2 1210 and SCI-2 1214) that indicates a different component carrier (or resource) of the one or more component carriers (or resources) designated for TB retransmission. In this case, the sidelink wireless communication device may transmit a selected packet of the one or more packets (e.g., transmit PSSCH packet 1212 or PSSCH packet 1216) on any single component carrier (or resource) of the one or more component carriers (or resources) associated with a successful LBT process (e.g., transmit PSSCH packet 1212 on CC1 1202 or transmit PSSCH packets 1216 on CC2 1204, depending, for example, on whether CC1 1202 or CC2 1204 received an LBT pass), where the selected packet may be selected based on a TB index number or a logical HARQ entity index number associated with the respective TB (e.g., as explained in connection with FIG. 10).

The first PSSCH 1212 packet, including TB1 and a first SCI-2 1210 and the second PSSCH 1216 packet, including TB1 and second SCI-2 1214 may also be generated in advance (e.g., in advance of a call for such PSSCH packets, for instance, following the obtaining of an LBT pass indicative of an availability of a component carrier or resource utilized for transport of one or more of the packets). The first SCI-2 1210 may indicate that a first transmission repetition of TB1 (e.g., a first retransmission of TB1) may occur on a first set of resources (depicted as the PSSCH 1228 with its own SCI-2 1226) and a second transmission repetition of TB1 (e.g., the second retransmission of TB1) may occur on a second set of resources (depicted as PSSCH 1232 with its own SCI-2 1230). The second SCI-2 1214 may indicate that a first transmission repetition of TB1 (e.g., a first retransmission of TB1) may occur on a third set of resources (depicted as the PSSCH 1236 with its own SCI-2 1234) and a second transmission repetition of TB1 (e.g., the second retransmission of TB1) may occur on a fourth set of resources (depicted as PSSCH 1240 with its own SCI-2 1238).

If an LBT process for slot 1 indicated an LBT pass for CC1 1202, the first PSSCH 1212 packet including TB1 and the first SCI-2 1210 would already be prepared and ready for transmission by the sidelink wireless communication device on CC1 1202. Conversely, if the LBT process for slot 1 indicated an LBT pass for CC2 1204, the second PSSCH 1216 packet including TB1 and the second SCI-2 1214 would already be prepared and ready for transmission by the sidelink wireless communication device on CC2 1204. Therefore, processing time may be reduced by pre-preparing in advance (e.g., pre-generating, generating in advance) the PSSCH 1212 and PSSCH 1216 packets in comparison to generating the PSSCH 1212 packet and/or PSSCH 1216 packet following, for example, the obtaining of an LBT pass for CC1 1202 or CC2 1204, respectively (or otherwise obtaining a call for the PSSCH packets).

Figure 13:
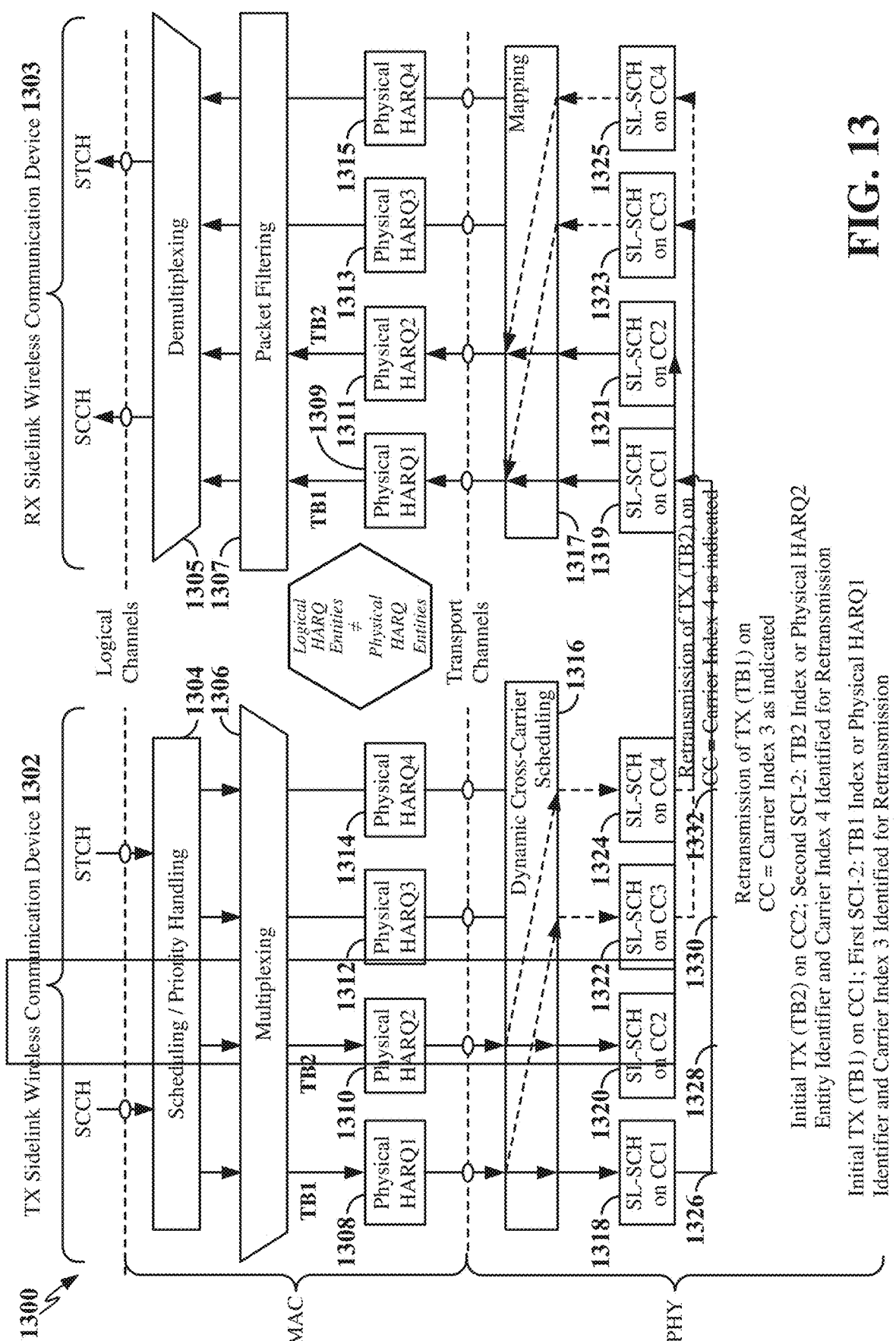
FIG. 13 is a block diagram of the Layer 1 and Layer 2 structures of a pair of a transmitting sidelink wireless communication device and a receiving sidelink wireless communication device with carrier aggregation configured, according to some aspects of the disclosure.

FIG. 13 is a block diagram of the Layer 1 and Layer 2 structures 1300 of a pair of a transmitting sidelink wireless communication device 1302 and a receiving sidelink wireless communication device 1303, with carrier aggregation configured, according to some aspects of the disclosure. FIG. 13 exemplifies cross-carrier retransmission in a licensed intra-band or inter-band operation. The transmitting sidelink wireless communication device 1302 and the receiving sidelink wireless communication device 1303 may be exemplified by the transmitting sidelink wireless communication device 1400 of FIG. 14 or 1900 of FIG. 19, and the receiving sidelink wireless communication device 1700 of FIG. 17, respectively.

The Layer 1 and Layer 2 sublayers of FIG. 13 are the same or similar to the Layer 1 and Layer 2 sublayers described above in connection with FIGS. 7A and 7B. In FIG. 13, only the PHY and MAC sublayers are presented to avoid cluttering the drawing. The description of these sublayers is the same as the description of the corresponding sublayers described above in connection with FIG. 7A and FIG. 7B and will not be repeated for the sake of brevity.

The services and functions of the MAC sublayer of FIG. 13 are the same or similar to the services and functions of the MAC sublayer described above in connection with FIG. 7A and FIG. 7B. It is noted that FIG. 13 depicts physical HARQ entities 1308, 1310, 1312, 1314, 1309, 1311, 1313, 1315. In some examples, logical HARQ entities may not be utilized in licensed intra-band or inter-band operations. The physical HARQ entities 1308, 1310, 1312, 1314 of the transmitting sidelink wireless communication device 1302, and the physical HARQ entities 1309, 1311, 1313, 1315 of the receiving sidelink wireless communication device 1303 may be similar to the physical HARQ entities 706, 710, 714, 718, 722, 726 of FIG. 7A and FIG. 7B.

In licensed band operation, an LBT process may not be used in advance of any transmission of a TB on an SL-SCH associated with any component carrier. However, the transmitting sidelink wireless communication device 1302 may be configured with a dynamic cross-carrier scheduling feature 1316, and the receiving sidelink wireless communication device 1303 may be configured with a mapping feature 1317 (e.g., a mapping process). Both features 1316 and 1317 are depicted in the PHY layer; however, the features could be in either the PHY or the MAC layer or be distributed in both the PHY layer and the MAC layer.

The dynamic cross-carrier scheduling feature 1316 may dynamically obtain indications to activate or deactivate cross-carrier scheduling and/or obtain or generate indications of one or more component carriers that are the target of the cross-carrier scheduling. The dynamic cross-carrier scheduling feature 1316 may dynamically obtain the indication in, for example, an SCI (e.g., first stage or second stage SCI) or in a medium access control-control element (MAC-CE). The dynamic cross-carrier scheduling feature 1316 may dynamically inform the receiving sidelink wireless communication device 1303 of the indication in, for example, an SCI (e.g., first stage or second stage SCI) or in a MAC-CE. By implementing dynamic cross-carrier scheduling in licensed intra-band and inter-band operations, the transmitting sidelink wireless communication device 1302 and the receiving sidelink wireless communication device 1303 may map (a transmission/retransmission of) a given TB to an indicated component carrier, without regard to whether an initial transmission of the given TB was transmitted on another component carrier. Accordingly, implementation of the dynamic cross-carrier scheduling described herein may break the one-to-one-to-one association between the given TB, an associated physical HARQ entity, and a component carrier associated with the physical HARQ entity.

For example, in the example of FIG. 13, physical HARQ1 entity 1308 is associated with TB1 and physical HARQ2 entity 1310 is associated with TB2. Furthermore, physical HARQ1 entity 1308 is associated with SL-SCH on CC1 1318 and physical HARQ2 entity 1310 is associated with SL-SCH on CC2 1320. Accordingly, TB1 is associated with CC1. The dynamic cross-carrier scheduling associated with the dynamic cross-carrier scheduling feature 1316 may occur prior to initial transmission or retransmission of TB1 and TB2 on any component carrier.

In the example of FIG. 13, the dynamic cross-carrier scheduling feature 1316 may not change the association between TB1, the physical HARQ1 entity 1308 assigned to/associated with TB1, and the SL-SCH on CC1 1318 for the initial transmission 1326 of TB1. As illustrated in the example, the initial transmission 1326 of TB1 (associated with the physical HARQ1 entity 1308) may be carried on the SL-SCH on CC1 1318 and includes a first SCI (e.g., a first SCI-2). Additionally, in the example of FIG. 13, the dynamic cross-carrier scheduling feature 1316 may not change the association between TB2, the physical HARQ2 entity 1310 assigned to/associated with TB2, and the SL-SCH on CC2 1320 for the initial transmission 1328 of TB2. As illustrated the initial transmission 1328 of TB2 (associated with the physical HARQ2 entity 1310) is carried on the SL-SCH on CC2 1320 and includes a second SCI (e.g., a second SCI-2).

However, the dynamic cross-carrier scheduling feature 1316 may generate (or modify) the SCI included with each TB so that the SCI indicates an intended component carrier (or resource) of the retransmission of the TB. The dynamic cross-carrier scheduling feature 1316 may indicate that the intended component carrier (or resource) of the retransmission of the TB may be a component carrier (or resource) that is different from the component carrier (or resource) associated with the initial transmission (or a retransmission) of the TB. Accordingly, the dynamic cross-carrier scheduling feature 1316 may break the one-to-one-to-one association between a given TB, a physical HARQ entity associated with the given TB, and a given component carrier (or resource) associated with the physical HARQ entity.

For example, as illustrated in FIG. 13, TB1 is associated with physical HARQ1 entity 1308. Physical HARQ1 entity 1308 is associated with the SL-SCH on CC1 1318 (accordingly, TB1 is initially associated with CC1). Also as illustrated, TB2 is associated with physical HARQ2 entity 1310. Physical HARQ2 entity 1310 is associated with the SL-SCH on CC2 1320 (accordingly, TB2 is initially associated with CC2). In the example, CC1 is associated with carrier index number 1 (e.g., carrier index 1); CC2 is associated with carrier index number 2 (e.g., carrier index 2). As illustrated in the example, the initial transmission 1326 of TB1 is carried on the SL-SCH on CC1 1318 and includes a first SCI (e.g., a first SCI-2); the initial transmission 1328 of TB2 is carried on the SL-SCH on CC2 1320 and includes a second SCI (e.g., a second SCI-2).

It may be expected (due, for example, to the one-to-one relationship between TBs and CCs (via associated physical HARQ entities) that retransmission of TB1 might occur on CC1 and retransmission of TB2 might occur on CC2. However, in the example of FIG. 13, the dynamic cross-carrier scheduling feature 1316 may have generated or modified the first SCI-2 to indicate that first retransmission 1330 of TB1 occurs on CC3 and may have generated or modified the second SCI-2 to indicate that the retransmission 1332 of TB2 occurs on CC4. In the example, CC3 is associated with carrier index number 3 (e.g., carrier index 3); CC4 is associated with carrier index number 4 (e.g., carrier index 4).

Accordingly, as shown by the dashed line arrows in FIG. 13, the dynamic cross-carrier scheduling feature 1316 may map the retransmission of TB1 (from CC1) to CC3, and mapped the retransmission of TB2 (from CC2) to CC4. Additionally, through the generation or modification of the first SCI-2, the dynamic cross-carrier scheduling feature 1316 has indicated to the mapping feature 1317 of receiving sidelink wireless communication device 1303 that a retransmission of TB1 is to be mapped from the SL-SCH on CC3 1323 to physical HARQ1 entity 1309, and indicated to the mapping feature 1317 of receiving sidelink wireless communication device 1303 that a retransmission of TB2 is to be mapped from the SL-SCH on CC4 1325 to physical HARQ2 entity 1311.

According to some aspects, FIG. 13 may exemplify a method of carrier selection of a cross-carrier retransmission at the transmitting sidelink wireless communication device 1302 in a wireless communication network. The carrier selection may be dynamic, changing from time to time, or being enabled or disabled from time to time. The method may be utilized, for example, in a licensed band of the wireless communication network. The carriers selected for retransmission may be intra-band or inter-band relative to an initial (or previous) transmission of the TB.

According to some aspects, the transmitting sidelink wireless communication device 1302 may determine to transmit an initial transmission of a transport block (TB) associated with a first hybrid automatic repeat request (HARQ) entity on a first carrier and determine to transmit a retransmission of the TB on a second carrier associated with a second HARQ entity, the second carrier being different from the first carrier and the second HARQ entity being different from the first HARQ entity. The transmitting sidelink wireless communication device may indicate to the receiving sidelink wireless communication device 1303 to map the retransmission of the TB (carried on the second carrier) to the first HARQ entity. In some aspects, the transmitting sidelink wireless communication device 1302 may indicate the mapping in an SCI (e.g., an SCI-2) or in a medium access control-control element (MAC-CE). In the example of FIG. 13, the transmitting sidelink wireless communication device 1302 may transmit the initial transmission 1326 of TB1 on the first carrier (e.g., CC1 identified by carrier index 1). The transmitting sidelink wireless communication device 1302 may transmit the first retransmission 1330 of TB1 on the second carrier (e.g., CC3 identified by carrier index 3).

In the example of FIG. 13, the transmitting sidelink wireless communication device 1302 may have generated an SCI (e.g., the first SCI-2) that includes, for example, at least one of: a TB index number of the initially transmitted TB (e.g., TB1) or a HARQ entity identifier of the first HARQ entity associated with the TB (e.g., a HARQ entity identifier of the physical HARQ1 entity 1308), an identifier of the second carrier (e.g., carrier index 3 associated with CC3 and identified in the first SCI-2 for retransmission of TB1), and an indication to map the retransmission of the TB on the second carrier (in the example of FIG. 13, CC3) to the first HARQ entity (e.g., an indication that may be utilized by the mapping feature 1317 to map TB1 received on the SL-SCH on CC3 1323 to the physical HARQ1 1309). The transmitting sidelink wireless communication device 1302 may transmit the SCI with the initial transmission 1326 of the TB (e.g., TB1) on the first carrier (e.g., CC1).

Figure 14:
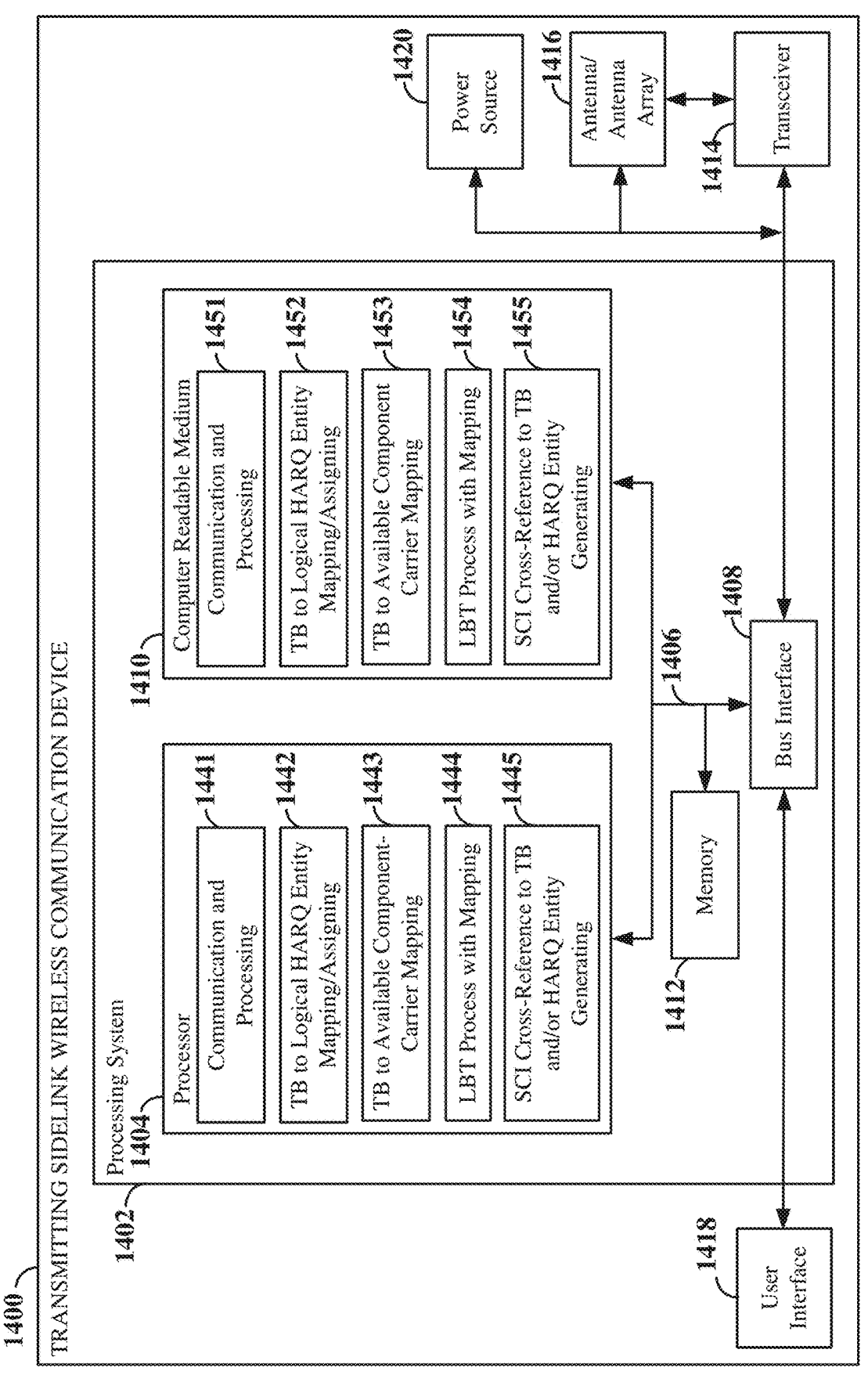
FIG. 14 is a block diagram illustrating an example of a hardware implementation of a transmitting sidelink wireless communication device employing a processing system according to some aspects of the disclosure.

FIG. 14 is a block diagram illustrating an example of a hardware implementation of a transmitting sidelink wireless communication device 1400 (e.g., a UE, a wireless communication device, etc.) employing a processing system 1402 according to some aspects of the disclosure. For example, the transmitting sidelink wireless communication device 1400 may be a UE or a wireless communication device, as illustrated in any one or more of FIGS. 1, 3, 7, 8, 10, 11, and/or 13.

In accordance with various aspects of the disclosure, an element, or any portion of an element, or any combination of elements may be implemented with a processing system 1402 that includes one or more processors, such as processor 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the transmitting sidelink wireless communication device 1400 may be configured to perform any one or more of the functions described herein. That is, the processor 1404, as utilized in the transmitting sidelink wireless communication device 1400, may be used to implement any one or more of the methods or processes described and illustrated, for example, in FIGS. 9-13, 15, 16, 18, and/or 20.

In this example, the processing system 1402 may be implemented with a bus architecture, represented generally by the bus 1406. The bus 1406 may include any number of interconnecting buses and bridges depending on the specific application of the processing system 1402 and the overall design constraints. The bus 1406 communicatively couples together various circuits, including one or more processors (represented generally by the processor 1404), a memory 1412, and computer-readable media (represented generally by the computer-readable medium 1410). The bus 1406 may also link various other circuits such as timing sources, peripherals, voltage regulators, and power management circuits, which are well known in the art, and therefore, will not be described any further.

A bus interface 1408 provides an interface between the bus 1406 and a transceiver 1414. The transceiver 1414 provides a means for communicating with various other apparatus over a transmission medium (e.g., air interface). The transceiver 1414 may further be coupled to one or more antennas/antenna array 1416. The bus interface 1408 further provides an interface between the bus 1406 and a user interface 1418 (e.g., keypad, display, touch screen, speaker, microphone, control features, etc.). Of course, such a user interface 1418 is optional and may be omitted in some examples. In addition, the bus interface 1408 further provides an interface between the bus 1406 and a power source 1420 of the transmitting sidelink wireless communication device 1400 or processing system 1402.

One or more processors, such as processor 1404, may be responsible for managing the bus 1406 and general processing, including the execution of software stored on the computer-readable medium 1410. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1410. The software, when executed by the processor 1404, causes the processing system 1402 to perform the various processes and functions described herein for any particular apparatus.

The computer-readable medium 1410 may be a non-transitory computer-readable medium and may be referred to as a computer-readable storage medium 1410 or a non-transitory computer-readable medium 1410. The non-transitory computer-readable medium 1410 may store computer-executable code (e.g., processor-executable code). The computer-executable code may include code for causing a computer (e.g., a processor) to implement one or more of the functions described herein. A non-transitory computer-readable medium 1410 includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1410 may reside in the processing system 1402, external to the processing system 1402, or distributed across multiple entities including the processing system 1402. The computer-readable medium 1410 may be embodied in a computer program product or article of manufacture. By way of example, a computer program product or article of manufacture may include a computer-readable medium 1410 in packaging materials. In some examples, the computer-readable medium 1410 may be part of the memory 1412. Those skilled in the art will recognize how best to implement the described functionality presented throughout this disclosure depending on the particular application and the overall design constraints imposed on the overall system. The computer-readable medium 1410 and/or the memory 1412 may also be used for storing data that is manipulated by the processor 1404 when executing software.

In some aspects of the disclosure, the processor 1404 may include communication and processing circuitry 1441 configured for various functions, including, for example, communicating with another sidelink wireless communication device, a UE, a wireless communication device, a base station, a network core (e.g., a 5G core network), or any other entity, such as, for example, local infrastructure or an entity communicating with the transmitting sidelink wireless communication device 1400 via the Internet, such as a network provider. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1441 may be configured to receive and process sidelink traffic and sidelink control (e.g., SCI type 1 and SCI type 2), receive and process uplink traffic and uplink control, and transmit and process downlink traffic and downlink control via the antennas/antenna array 1416 and the transceiver 1414. The communications and processing circuitry 1441, in conjunction with the transceiver 1414 and antennas/antenna array 1416 may also be configured for transmitting a transport block (TB) to a receiving sidelink wireless communication device on an available component carrier, the TB being associated with a first sidelink control information (SCI) that cross-references the TB to the logical HARQ entity, and retransmitting the TB on a different available component carrier, the retransmitted TB being associated with a second SCI that cross-references the retransmitted TB to the logical HARQ entity. In some examples, the communication and processing circuitry 1441 may include one or more hardware components that provide the physical structure that performs processes related to transmitting a transport block (TB) to a receiving sidelink wireless communication device on an available component carrier, the TB being associated with a first sidelink control information (SCI) that cross-references the TB to the logical HARQ entity, and retransmitting the TB on a different available component carrier, the retransmitted TB being associated with a second SCI that cross-references the retransmitted TB to the logical HARQ entity. The communication and processing circuitry 1441 may further be configured to execute communication and processing software 1451 stored on the computer-readable medium 1410 to implement one or more functions described herein.

In some aspects of the disclosure, the processor 1404 may include TB to logical HARQ entity mapping/assigning circuitry 1442 configured for various functions, including, for example, assigning a TB to a logical hybrid automatic repeat request (HARQ) entity. In some examples, the TB to logical HARQ entity mapping/assigning circuitry 1442 may include one or more hardware components that provide the physical structure that performs processes related to performing the assigning of the TB to the logical hybrid automatic repeat request (HARQ) entity. The TB to logical HARQ entity mapping/assigning circuitry 1442 may further be configured to execute TB to logical HARQ entity mapping/assigning software 1452 stored on the computer-readable medium 1410 to implement one or more functions described herein.

In some aspects, the logical HARQ entity may be associated with the available component carrier for transmitting the TB to the receiving sidelink wireless communication device and associated with the different available component carrier for retransmitting the TB to the receiving sidelink wireless communication device.

In some aspects, the logical HARQ entity may change its association with component carriers in the plurality of component carriers based on a listen before talk (LBT) process. The logical HARQ entity may be different from a physical HARQ entity that maintains an association with a component carrier in the plurality of component carriers independent of the LBT process.

As indicated above, the first SCI and the second SCI may be second stage SCIs (SCI-2s) that may be transported on a physical sidelink shared channel (PSSCH).

In some aspects, the logical HARQ entity may be associated with all component carriers of the plurality of component carriers. That is, there may be one logical HARQ entity that is associated with all component carriers of the plurality of component carriers as show and described in FIG. 11, for example. A logical HARQ process identifier may be associated with the TB in such aspects. In this aspect, the plurality of component carriers may be intra-band component carriers.

In some aspects, the logical HARQ entity may be at least one of a plurality of logical HARQ entities as shown and described in FIG. 10, for example. The communication and processing circuitry 1441 may further associate a physical HARQ entity index number with the TB. In such an aspect, the plurality of component carriers may include at least one of intra-band component carriers or inter-band component carriers.

As stated above, in some aspects, the plurality of component carriers may operate in an unlicensed spectrum and/or a licensed spectrum.

In some aspects of the disclosure, the processor 1404 may include TB to available component carrier mapping circuitry 1443 configured for various functions, including, for example, mapping the TB to an available component carrier in a plurality of component carriers (e.g., for an initial transmission of the TB) and mapping the TB to a different available component carrier in the plurality of component carriers (e.g., for a retransmission of the TB). In some examples, the TB to available component carrier mapping circuitry 1443 may include one or more hardware components that provide the physical structure that performs processes related to performing the mapping of the TB to the available component carrier in a plurality of component carriers and mapping the TB to a different available component carrier in the plurality of component carriers. The TB to available component carrier mapping circuitry 1443 may further be configured to execute TB to available component carrier mapping software 1453 stored on the computer-readable medium 1410 to implement one or more functions described herein.

In some aspects of the disclosure, the processor 1404 may include listen before talk (LBT) process with mapping circuitry 1444 configured for various functions, including, for example, performing LBT processes, such as a first LBT process prior to mapping the TB to the available component carrier to identify the available component carrier in the plurality of component carriers, and a second LBT process, subsequent to the first LBT process and prior to mapping the TB to the different available component carrier to identify the different available component carrier. The LBT process with mapping circuitry 1444 may work in conjunction with the TB to available component carrier mapping circuitry 1443. In some examples, the LBT process with mapping circuitry 1444 may include one or more hardware components that provide the physical structure that performs processes related to performing the first LBT process prior to mapping the TB to the available component carrier to identify the available component carrier in the plurality of component carriers, and performing the second LBT process, subsequent to the first LBT process and prior to mapping the TB to the different available component carrier to identify the different available component carrier. The LBT process with mapping circuitry 1444 may further be configured to execute the LBT process with mapping software 1454 stored on the computer-readable medium 1410 to implement one or more functions described herein. The LBT process with mapping circuitry 1444 may be represented in FIGS. 10 and 11 as the LBT process with mapping feature 1016 and 1116, respectively. However, and for example, the LBT process with mapping feature may be additionally or alternatively accomplished using the communication and processing circuitry 1441.

In some aspects of the disclosure, the processor 1404 may include SCI cross-reference to TB and/or HARQ entity generating circuitry 1445 configured for various functions, including, for example, generating an SCI (e.g., and SCI-2) that cross-references the TB to the logical HARQ entity for initial transmission and retransmission, and/or that associates the TB with the second SCI that cross-references the TB to the logical HARQ entity for the retransmission. In some examples, the SCI cross-reference to TB and/or HARQ entity generating circuitry 1445 may include one or more hardware components that provide the physical structure that performs processes related to performing the generating of the SCI (e.g., and SCI-2) that cross-references the TB to the logical HARQ entity for initial transmission and retransmission, and/or that associates the TB with the second SCI that cross-references the TB to the logical HARQ entity for the retransmission. The SCI cross-reference to TB and/or HARQ entity generating circuitry 1445 may further be configured to execute SCI cross-reference to TB and/or HARQ entity generation software 1455 stored on the computer-readable medium 1410 to implement one or more functions described herein.

In some aspects of the disclosure, SCI cross-reference to TB and/or HARQ entity generating circuitry 1445 may be configured for other functions, including, for example, generating one or more packets, each including a respective transport block (TB) and a respective SCI indicating a respective component carrier of one or more component carriers designated for TB retransmission. In some examples, the SCI cross-reference to TB and/or HARQ entity generating circuitry 1445 may also include one or more hardware components that provide the physical structure that performs processes related to generating the one or more packets, each including a respective transport block (TB) and a respective SCI indicating a respective component carrier of one or more component carriers designated for TB retransmission. According to some aspects, the one or more packets may include a packet generated for use on any of the one or more component carriers, and the respective SCI, associated with the packet, may indicate a component carrier of the one or more component carriers designated for TB retransmission. In such aspects, the transmitting sidelink wireless communication device may further transmit the packet as the selected packet on any component carrier of the one or more component carriers associated with a successful LBT process (e.g., as indicated by an LBT pass). In some aspects, the one or more packets may include a plurality of packets each generated for use on any of the one or more component carriers. Each of the plurality of packets may have a respective SCI that indicates a different component carrier of the one or more component carriers designated for TB retransmission. In such aspects, the transmitting sidelink wireless communication device may further transmit a selected packet of the one or more packets on any component carrier of the one or more component carriers associated with a successful LBT process, wherein the selected packet is selected based on a TB index number or a logical HARQ entity index number associated with the respective TB.

In some aspects, the first SCI and the second SCI may each indicate at least one of: a TB index number of the TB, a logical HARQ entity index number associated with the TB, a physical HARQ entity index number associated with the TB, or a physical HARQ process identifier associated with the TB.

FIG. 15 is a flow chart illustrating an exemplary process 1500 (e.g., a method) at a transmitting sidelink wireless communication device (e.g., a UE, a wireless communication device, etc.) for implementing a use of logical HARQ entities (as distinguished from physical HARQ entities) and a listen before talk (LBT) processing and mapping feature to execute cross-carrier retransmission of transport blocks (TBs), according to some aspects of the disclosure. As described below, some or all illustrated features may be omitted in a particular implementation within the scope of the present disclosure, and some illustrated features may not be required for the implementation of all examples. In some examples, the process 1500 may be carried out by the transmitting sidelink wireless communication device 1400 illustrated in FIG. 14. In some examples, the process 1500 may be carried out by any suitable apparatus or means for carrying out the functions or algorithms described herein.

At block 1502, the transmitting sidelink wireless communication device (e.g., a transmitting sidelink wireless communication device 1002 of FIG. 10, 1102 of FIG. 11, 1302 of FIG. 13, 1400 of FIG. 14) may assign a transport block (TB) to a logical hybrid automatic repeat request (HARQ) entity. For example, the TB to logical HARQ entity mapping/assigning circuitry 1442 shown and described above in connection with FIG. 14, may provide a means for assign a transport block (TB) to a logical hybrid automatic repeat request (HARQ) entity.

At block 1504, the transmitting sidelink wireless communication device may map the TB to an available component carrier in a plurality of component carriers. For example, the TB to available component carrier mapping circuitry 1443, shown and described above in connection with FIG. 14, may provide a means for mapping the TB to an available component carrier in a plurality of component carriers.

At block 1506, the transmitting sidelink wireless communication device may transmit the TB to a receiving sidelink wireless communication device on the available component carrier. The TB is associated with a first sidelink control information (SCI) that cross-references the TB to the logical HARQ entity. For example, the communication and processing circuitry 1441, in conjunction with the transceiver 1414 and antennas/antenna array 1416, shown and described above in connection with FIG. 14, may provide a means for transmitting the TB to a receiving sidelink wireless communication device on the available component carrier, the TB being associated with a first sidelink control information (SCI) that cross-references the TB to the logical HARQ entity.

At block 1508, the transmitting sidelink wireless communication device may map the TB to a different available component carrier in the plurality of component carriers. For example, the TB to available carrier mapping circuitry 1443, shown and described above in connection with FIG. 14, may provide a means mapping the TB to a different available component carrier in the plurality of component carriers.

At block 1510, the transmitting sidelink wireless communication device may retransmit the TB on the different available component carrier, the retransmitted TB being associated with a second SCI that cross-references the retransmitted TB to the logical HARQ entity. For example, the communication and processing circuitry 1441, in conjunction with the transceiver 1414 and antennas/antenna array 1416, shown and described above in connection with FIG. 14, may provide a means for retransmitting the TB on the different available component carrier, the retransmitted TB being associated with a second SCI that cross-references the retransmitted TB to the logical HARQ entity.

FIG. 16 is a flow chart illustrating an exemplary process 1600 (e.g., a method) at a transmitting sidelink wireless communication device (e.g., a UE, a wireless communication device, etc.) for generating one or more packets (e.g., PSSCH packets including an SCI and a TB) in advance according to some aspects of the disclosure. Generating the packets in advance (e.g., in advance of a call for such PSSCH packets, for instance, following the obtaining of an LBT pass indicative of an availability of a component carrier or resource utilized for transport of one or more of the packets) may facilitate having the packets available for immediate use when the transmitting sidelink wireless communication device (e.g., the transmitting sidelink wireless communication device 1400 of FIG. 14 or 1900 of FIG. 19) is ready to transmit the packets. According to some aspects of the disclosure, the pre-prepared packets may find utility in the execution of cross-carrier retransmission of transport blocks (TBs). As described below, some or all illustrated features may be omitted in a particular implementation within the scope of the present disclosure, and some illustrated features may not be required for the implementation of all examples. In some examples, the process 1600 may be carried out by the transmitting sidelink wireless communication device 1400 illustrated in FIG. 14. In some examples, the process 1600 may be carried out by any suitable apparatus or means for carrying out the functions or algorithms described herein.

At block 1602, the transmitting sidelink wireless communication device (e.g., a transmitting sidelink wireless communication device 1002 of FIG. 10, 1102 of FIG. 11, 1302 of FIG. 13, 1400 of FIG. 14) may generate one or more packets, each including a respective transport block (TB) and a respective sidelink control information (SCI) indicating a respective component carrier of one or more component carriers designated for TB retransmission. For example, the SCI cross-reference to TB and/or HARQ entity generating circuitry 1445 shown and described above in connection with FIG. 14, may provide a means for generating one or more packets, each including a respective transport block (TB) and a respective sidelink control information (SCI) indicating a respective component carrier of one or more component carriers designated for TB retransmission.

At block 1604, the transmitting sidelink wireless communication device may perform a respective listen before talk (LBT) process on each of the one or more component carriers. For example, the LBT process with mapping circuitry 1444 shown and described above in connection with FIG. 14, may provide a means for performing a respective listen before talk (LBT) process on each of the one or more component carrier.

At block 1606, the transmitting sidelink wireless communication device may transmit a selected packet of the one or more packets on a component carrier of the one or more component carriers based on the LBT processes. For example, the LBT process with mapping circuitry 1444 and/or the communication and processing circuitry 1441 in conjunction with the transceiver 1414 and antennas/antenna array 1416 shown and described above in connection with FIG. 14, may provide a means for performing the transmitting of the selected packet of the one or more packets on a component carrier of the one or more component carriers based on the LBT processes.

According to some aspects, when the one or more packets include a single packet generated for use on any of the one or more component carriers, and the respective SCI, associated with the single packet, indicates a single component carrier of the one or more component carriers designated for TB retransmission, the transmitting sidelink wireless communication device may further transmit the single packet as the selected packet on any single component carrier of the one or more component carriers associated with a successful LBT process. According to some aspects, the one or more packets may include a plurality of packets, each generated for use on any of the one or more component carriers. Each has a respective SCI that indicates a different component carrier of the one or more component carriers designated for TB retransmission. According to such an aspect, the transmitting sidelink wireless communication device may further transmit a selected packet of the one or more packets on any single component carrier of the one or more component carriers associated with a successful LBT process, where the selected packet may be selected based on a TB index number or a logical HARQ entity index number associated with the respective TB.

Figure 17:
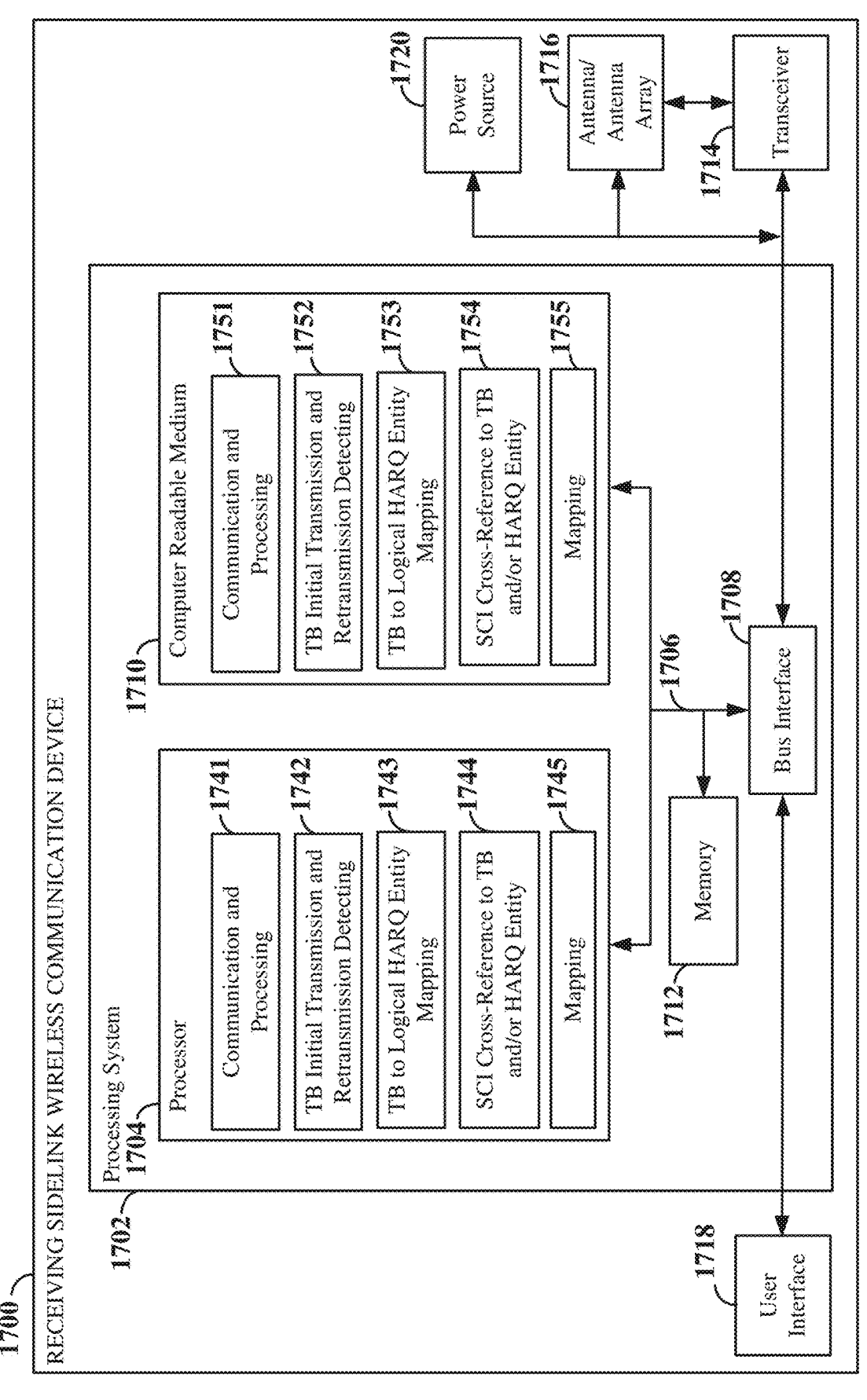
FIG. 17 is a block diagram illustrating an example of a hardware implementation of a receiving sidelink wireless communication device employing a processing system according to some aspects of the disclosure.

FIG. 17 is a block diagram illustrating an example of a hardware implementation of a receiving sidelink wireless communication device 1700 (e.g., a UE, a wireless communication device) employing a processing system 1702 according to some aspects of the disclosure. In accordance with various aspects of the disclosure, an element, or any portion of an element, or any combination of elements may be implemented with a processing system 1702 that includes one or more processors, such as processor 1704. For example, the receiving sidelink wireless communication device 1700 may be a UE, a wireless communication device, etc., as illustrated in any one or more of FIG. 1, 3, 7, 8, 10, 11, or 13.

The processing system 1702 may be substantially the same as the processing system 1402 illustrated in FIG. 14, including a processor 1704, a bus 1706, a bus interface 1708, a memory 1712, and a computer-readable medium 1710. Furthermore, the receiving sidelink wireless communication device 1700 may include a user interface 1718, a transceiver 1714, antennas/antenna array 1716, and a power source 1720 substantially similar to those described above in FIG. 14. That is, the processor 1704, as utilized in the receiving sidelink wireless communication device 1700, may be used to implement any one or more of the processes described herein and illustrated, for example, in FIGS. 9-13, 15, 16, 18, and/or 20.

In some aspects of the disclosure, the processor 1704 may include communication and processing circuitry 1741 configured for various functions, including, for example, communicating with another sidelink wireless communication device, a UE, a wireless communication device, a network core (e.g., a 5G core network), or any other entity, such as, for example, local infrastructure or an entity communicating with the transmitting sidelink wireless communication device 1400 via the Internet, such as a network provider. In some examples, the communication and processing circuitry 1741 may include one or more hardware components that provide the physical structure that performs processes related to wireless communication (e.g., signal reception and/or signal transmission) and signal processing (e.g., processing a received signal and/or processing a signal for transmission). In addition, the communication and process- ing circuitry 1741 may be configured to receive and process uplink traffic and uplink control and transmit and process downlink traffic and downlink control via the antennas/ antenna array 1716 and the transceiver 1714. The commu- nication and processing circuitry 1741 may further be con- figured to execute communication and processing software 1751 stored on the computer-readable medium 1710 to implement one or more functions described herein.

In some aspects of the disclosure, the processor 1704 may include transport block (TB) initial transmission and retrans- mission detecting circuitry 1742 configured for various functions, including, for example, detecting a transport block (TB) transmitted from a transmitting sidelink wireless communication device, on a first component carrier of a plurality of component carriers, the TB being associated with a first sidelink control information (SCI) that cross- references the TB to at least one of a TB index number or a logical hybrid automatic repeat request (HARQ) entity index number, and detecting a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number. In some examples, the TB initial transmission and retransmission detecting circuitry 1742 may include one or more hardware components that provide the physical structure that performs processes related to performing the detecting of the TB, transmitted from the transmitting sidelink wireless communication device, on the first component carrier of the plurality of component carriers, the TB being associated with the first sidelink control information (SCI) that cross-references the TB to at least one of the TB index number or a logical hybrid automatic repeat request (HARQ) entity index number, and the detecting of the retransmission of the TB on the second component carrier of the plurality of component carriers, the second component carrier being different from the first component carrier, the retransmission of the TB being associated with the second SCI that cross-references the TB to at least one of the TB index number or the logical HARQ entity index number. The TB initial transmission and retransmission detecting circuitry 1742 may further be con- figured to execute TB initial transmission and retransmission detecting software 1752 stored on the computer-readable medium 1710 to implement one or more functions described herein.

In some aspects of the disclosure, the processor 1704 may include TB to logical HARQ entity mapping circuitry 1743 configured for various functions, including, for example, mapping the TB to a logical HARQ entity corresponding to the at least one of the TB index number or the logical HARQ entity index number, and mapping the retransmission of the TB to the physical HARQ entity corresponding to the at least one of the TB index number or the logical HARQ entity index number. In some examples, the TB to logical HARQ entity mapping circuitry 1743 may include one or more hardware components that provide the physical structure that performs processes related to performing the switching (of frequencies) from the first uplink carrier of the Pcell to the target uplink carrier. The TB to logical HARQ entity mapping circuitry 1743 may further be configured to execute TB to logical HARQ entity mapping software 1753 stored on the computer-readable medium 1710 to implement one or more functions described herein.

In some aspects of the disclosure, the processor 1704 may include SCI cross-reference to TB and/or HARQ entity circuitry 1744 configured for various functions, including, for example, determining from an initial or retransmitted SCI (e.g., an SCI-2) a cross-reference between the initial or retransmitted TB (referenced in the SCI) and at least one of a TB index number or a logical hybrid automatic repeat request (HARQ) entity index number. In some examples, the SCI cross-reference to TB and/or HARQ entity circuitry 1744 may include one or more hardware components that provide the physical structure that performs processes related to performing the determining from the initial or retransmitted SCI (e.g., an SCI-2) the cross-reference between the initial or retransmitted TB and at least one of a TB index number or a logical hybrid automatic repeat request (HARQ) entity index number. The SCI cross-refer- ence to TB and/or HARQ entity circuitry 1744 may further be configured to execute SCI cross-reference to TB and/or HARQ entity software 1754 stored on the computer-read- able medium 1710 to implement one or more functions described herein.

In some aspects of the disclosure, the processor 1704 may include mapping circuitry 1745 configured for various func- tions, including, for example, mapping TBs to logical and/or physical HARQ entities in connection with the TB to logical HARQ entity mapping circuitry 1743. In some examples, the TB to logical HARQ entity mapping circuitry 1743 may include one or more hardware components that provide the physical structure that performs processes related to map- ping TBs to logical and/or physical HARQ entities. The mapping circuitry 1745 may further be configured to execute mapping software 1755 stored on the computer-readable medium 1710 to implement one or more functions described herein. The mapping circuitry 1745 and/or the TB to logical HARQ entity mapping circuitry 1743 may be represented in FIGS. 10 and 11 as the mapping feature 1017 and 1117, respectively. However, any mapping process may be accomplished using the communication and processing circuitry 1741, for example.

In some aspects, the logical HARQ entity may be associated with all component carriers of the plurality of component carriers. In other words, there may be one HARQ entity that is associated with all of the component carriers. In this aspect, the plurality of component carriers may be intra-band component carriers. In such an aspect, the receiving sidelink wireless communication device may further associate a logical or physical HARQ process identifier with the TB based on the first and/or second SCI.

In some aspects, if the logical HARQ entity is at least one of a plurality of logical HARQ entities, the receiving sidelink wireless communication device may also associate a physical HARQ entity index number to the TB, based on the first and/or second SCI. In such aspects, the plurality of component carriers may comprise at least one of intra-band component carriers or inter-band intra-band component carriers.

In some aspects, the first SCI and the second SCI may each indicate at least one of: a TB index number of the TB, a logical HARQ entity index number associated with the TB, a physical HARQ entity index number associated with the TB, or a physical HARQ process identifier associated with the TB.

According to some aspects, the plurality of component carriers may exist in an unlicensed spectrum.

FIG. 18 is a flow chart illustrating an exemplary process 1800 (e.g., a method) at a receiving sidelink wireless communication device (e.g., a UE, a wireless communication device, etc.) for implementing a use of logical HARQ entities (as distinguished from physical HARQ entities) and a mapping feature at the receiving sidelink wireless communication device 1700 of FIG. 17 to execute cross-carrier retransmission of transport blocks (TBs) according to some aspects of the disclosure. As described below, some or all illustrated features may be omitted in a particular implementation within the scope of the present disclosure, and some illustrated features may not be required for the implementation of all examples. In some examples, the process 1800 may be carried out by the receiving sidelink wireless communication device 1700 illustrated in FIG. 17. In some examples, the process 1800 may be carried out by any suitable apparatus or means for carrying out the functions or algorithms described herein.

At block 1802, the receiving sidelink wireless communication device may detect a transport block (TB), transmitted from a transmitting sidelink wireless communication device, on a first component carrier of a plurality of component carriers, the TB being associated with a first sidelink control information (SCI) that cross-references the TB to at least one of a TB index number or a logical hybrid automatic repeat request (HARQ) entity index number). For example, the TB initial transmission and retransmission detecting circuitry 1742, shown and described above in connection with FIG. 17, may provide a means for detecting a transport block (TB), transmitted from a transmitting sidelink wireless communication device, on a first component carrier of a plurality of component carriers, the TB being associated with a first sidelink control information (SCI) that cross-references the TB to at least one of a TB index number or a logical hybrid automatic repeat request (HARQ) entity index number.

At block 1804, the receiving sidelink wireless communication device may map the TB to a logical HARQ entity corresponding to the at least one of the TB index number or the logical HARQ entity index number. For example, the TB to logical HARQ entity mapping circuitry 1743 shown and described above in connection with FIG. 17 may provide a means for mapping the TB to a logical HARQ entity corresponding to the at least one of the TB index number or the logical HARQ entity index number.

At block 1806, the receiving sidelink wireless communication device may detect a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number. For example, the TB initial and retransmission detecting circuitry 1742 shown and described above in connection with FIG. 17 may provide the means for detecting a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number.

At block 1808, the receiving sidelink wireless communication device may map the retransmission of the TB to the physical HARQ entity corresponding to the at least one of the TB index number or the logical HARQ entity index number. For example, the TB to logical HARQ entity mapping circuitry 1743 shown and described above in connection with FIG. 17 may provide the means for mapping the retransmission of the TB to the physical HARQ entity corresponding to the at least one of the TB index number or the logical HARQ entity index number.

In some aspects, the logical HARQ entity may be associated with all component carriers of the plurality of component carriers. In other words, there may be one HARQ entity that is associated with all of the component carriers. In this aspect, the plurality of component carriers may be intra-band component carriers. In such an aspect, the receiving sidelink wireless communication device may further associate a logical or physical HARQ process identifier with the TB based on the first and/or second SCI.

In some aspects, if the logical HARQ entity is at least one of a plurality of logical HARQ entities, the receiving sidelink wireless communication device may also associate a physical HARQ entity index number to the TB, based on the first and/or second SCI. In such aspects, the plurality of component carriers may comprise at least one of intra-band component carriers or inter-band component carriers.

In some aspects, the first SCI and the second SCI may each indicate at least one of: a TB index number of the TB, a logical HARQ entity index number associated with the TB, a physical HARQ entity index number associated with the TB, or a physical HARQ process identifier associated with the TB.

According to some aspects, the plurality of component carriers may exist in an unlicensed spectrum.

Figure 19:
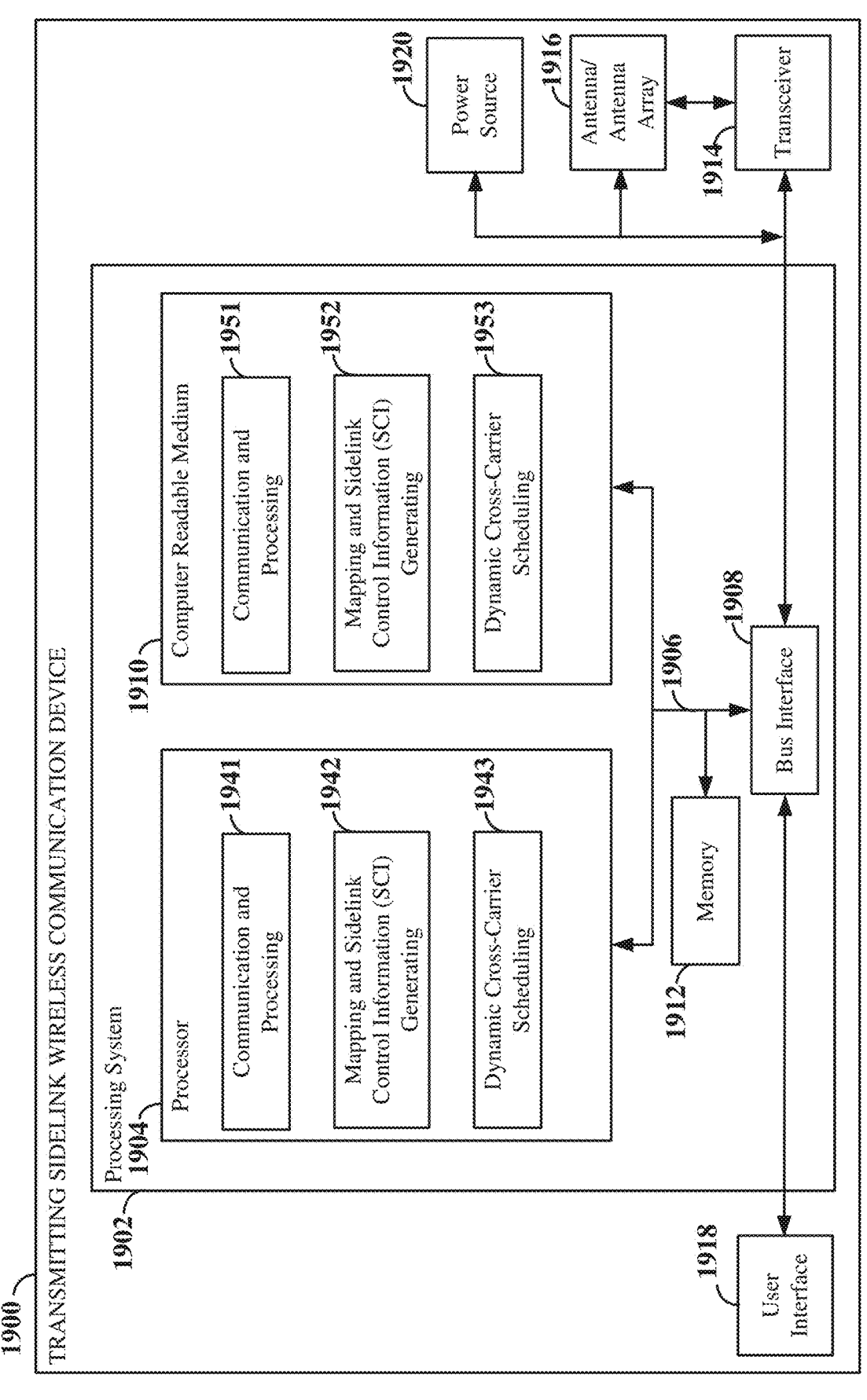
FIG. 19 is a block diagram illustrating an example of a hardware implementation of a transmitting sidelink wireless communication device employing a processing system according to some aspects of the disclosure.

FIG. 19 is a block diagram illustrating an example of a hardware implementation of a transmitting sidelink wireless communication device 1900 employing a processing system 1902 according to some aspects of the disclosure. According to some aspects, the transmitting sidelink wireless communication device 1900 may be similar to the transmitting sidelink wireless communication device 1400 as shown and described in FIG. 14. In some examples, the transmitting sidelink wireless communication device 1900 may operate in a licensed spectrum. For example, the transmitting sidelink wireless communication device 1900 may be a UE or wireless communication device as illustrated in any one or more of FIGS. 1, 3, 7, 8, 10, 11, 13, and/or 14.

In accordance with various aspects of the disclosure, an element, or any portion of an element, or any combination of elements, may be implemented with a processing system 1902 that includes one or more processors, such as processor 1904. The processing system 1902 may be substantially the same as the processing system 1402 illustrated in FIG. 14, including a processor 1904, a bus 1906, a bus interface 1908, a memory 1912, and a computer-readable medium 1910. Furthermore, the transmitting sidelink wireless communication device 1900 may include a user interface 1918, a transceiver 1914, antennas/antenna array 1916, and a power source 1920 substantially similar to those described above in FIG. 14. That is, the processor 1904, as utilized in the transmitting sidelink wireless communication device 1900, may be used to implement any one or more of the processes described herein and illustrated, for example, in FIGS. 9-13, 15, 16, 18, and/or 20.

In some aspects of the disclosure, the processor 1904 may include communication and processing circuitry 1941 configured for various functions, including, for example, communicating with another sidelink wireless communication device, a UE, a wireless communication device, a base station, a network core (e.g., a 5G core network), or any other entity, such as, for example, local infrastructure or an entity communicating with the transmitting sidelink wireless communication device 1900 via the Internet, such as a network provider. In some examples, the communication and processing circuitry 1941 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1441 may be configured to receive and process sidelink traffic and sidelink control (e.g., SCI type 1 and SCI type 2), receive and process uplink traffic and uplink control, and transmit and process downlink traffic and downlink control via the antennas/antenna array 1916 and the transceiver 1914. The communication and processing circuitry 1941, in conjunction with the transceiver 1914 and the antennas/antenna array 1916, may further be configured to transmit an initial transmission of a transport block (TB), associated with a first physical hybrid automatic repeat request (HARQ) entity, on a first carrier as well as transmit a retransmission of the TB on a second carrier where the second carrier is different from the first carrier, the second carrier is associated with a second physical HARQ entity, and the second physical HARQ entity is different from the first physical HARQ entity. In some examples, the communication and processing circuitry 1941 may further include one or more hardware components that provide the physical structure that performs processes related to transmitting an initial transmission of a transport block (TB), associated with the first physical hybrid automatic repeat request (HARQ) entity, on the first carrier and transmitting the retransmission of the TB on the second carrier, where the second carrier is different from the first carrier, the second carrier is associated with the second physical HARQ entity, and the second physical HARQ entity is different from the first physical HARQ entity. The communication and processing circuitry 1941 may further be configured to execute communication and processing software 1951 stored on the computer-readable medium 1910 to implement one or more functions described herein.

In some aspects of the disclosure, the processor 1904 may include mapping and sidelink control information (SCI) generating circuitry 1942 configured for various functions, including, for example, mapping a retransmission of an initial transmission of a TB, carried on a second carrier associated with a second physical HARQ entity, to a first physical HARQ entity (where the initial transmission of the TB may be on a first carrier associated with a first physical HARQ entity). In some aspects, the second carrier may be different from the first carrier and the second physical HARQ entity may be different from the first physical HARQ entity. The mapping and SCI generating circuitry 1942 may further be configured various functions including, for example, generating an SCI including at least one of: a TB index number of the TB or a physical HARQ entity identifier of the first physical HARQ entity; and an identifier of the second carrier. The SCI may indicate to a receiving sidelink wireless communication device that the receiving sidelink wireless communication device may map the TB retransmitted on the second carrier to the first HARQ entity. In some examples, the mapping and SCI generating circuitry 1942 may include one or more hardware components that provide the physical structure that performs processes related to performing the mapping of the retransmission of the initial transmission of the TB, carried on the second carrier associated with the second physical HARQ entity, to the first physical HARQ entity (where the initial transmission of the TB may be on the first carrier associated with the first physical HARQ entity), and generating the SCI including at least one of: the TB index number of the TB or the physical HARQ entity identifier of the first physical HARQ entity; and an identifier of the second carrier. The mapping and SCI generating circuitry 1942 may further be configured to execute mapping and SCI generating software 1952 stored on the computer-readable medium 1910 to implement one or more functions described herein.

In some aspects of the disclosure, the processor 1904 may include dynamic cross-carrier scheduling circuitry 1943, configured for various functions, including, for example, indicating to a receiving sidelink wireless communication device a mapping of a retransmission of the TB, carried on a second carrier associated with a second physical HARQ entity, to a first physical HARQ entity. The initial transmission of the TB may be carried on a first carrier associated with the first physical HARQ entity. According to some aspects, the mapping of the retransmission of the TB may be indicated in a sidelink control information (SCI) or a medium access control-control element (MAC-CE). According to some aspects, the indicating of the mapping to the receiving sidelink wireless communication device may be carried out by transmitting the SCI with the initial transmission of the TB. In some examples, the dynamic cross-carrier scheduling circuitry 1943 may include one or more hardware components that provide the physical structure that performs processes related to performing the indicating to the receiving sidelink wireless communication device the mapping of the retransmission of the TB, carried on the second carrier associated with the second physical HARQ entity, to the first physical HARQ entity, where the indicating of the mapping to the receiving sidelink wireless communication device may be carried out by transmitting the SCI with the initial transmission of the TB. The dynamic cross-carrier scheduling circuitry 1943 may determine the second carrier frequency and may dynamically (e.g., continuously, or semi-continuously, or autonomously or with direction) cause the retransmission to be a cross-carrier retransmission and/or enable and disable cross-carrier retransmissions. In some aspects, the retransmission of the TB may be intra-band or inter-band relative to the initial transmission of the TB. The dynamic cross-carrier scheduling circuitry 1943 may further be configured to execute dynamic cross-carrier scheduling circuitry software 1955 stored on the computer-readable medium 1910 to implement one or more functions described herein.

FIG. 20 is a flow chart illustrating an exemplary process 2000 (e.g., a method) of transport block (TB) retransmission at a transmitting sidelink wireless communication device in a wireless communication network. As described below, some or all illustrated features may be omitted in a particular implementation within the scope of the present disclosure, and some illustrated features may not be required for the implementation of all examples. In some examples, the process 2000 may be carried out by the transmitting sidelink wireless communication device 1900 illustrated in FIG. 19. In some examples, the process 2000 may be carried out by any suitable apparatus or means for carrying out the functions or algorithms described herein.

At block 2002, the transmitting sidelink wireless communication device may transmit an initial transmission of a transport block (TB), associated with a first physical hybrid automatic repeat request (HARQ) entity, on a first carrier. For example, the communication and processing circuitry 1941, in conjunction with the transceiver 1914 and antennas/antenna array 1916 shown and described above in connection with FIG. 19, may provide a means for transmitting the initial transmission of the transport block (TB), associated with the first physical hybrid automatic repeat request (HARQ) entity, on the first carrier.

At block 2004, the transmitting sidelink wireless communication device may indicate to a receiving sidelink wireless communication device a mapping of a retransmission of the TB, carried on a second carrier associated with a second physical HARQ entity, to the first physical HARQ entity. In some examples, the second carrier may be different from the first carrier and the second physical HARQ entity may be different from the first physical HARQ entity. According to some examples, the mapping of the retransmission of the TB may be indicated in a sidelink control information (SCI) or a medium access control-control element (MAC-CE). The SCI may be generated by the mapping and SCI generating circuitry 1942. The SCI may include, for example, at least one of a TB index number of the TB or a physical HARQ entity identifier of the first physical HARQ entity; and an identifier of the second carrier. The mapping may be performed using the mapping and SCI generating circuitry 1942 as shown and described above in connection with FIG. 19. Furthermore, the mapping and SCI generating circuitry 1942 may provide a means for performing the mapping. In some aspects, the dynamic cross-carrier scheduling circuitry 1943, shown and described above in connection with FIG. 19, may provide a means for indicating to a receiving sidelink wireless communication device the mapping of the retransmission of the TB, carried on the second carrier associated with a second physical HARQ entity, to the first physical HARQ entity. In some examples, the indicating of the mapping to the receiving sidelink wireless communication device may be performed by transmitting the SCI with the initial transmission of the TB.

At block 2006, the transmitting sidelink wireless communication device may transmit the retransmission of the TB on the second carrier. The initial transmission and the retransmission my occur in a licensed band of the wireless communication network. The retransmission of the TB may be intra-band or inter-band relative to the initial transmission of the TB. For example, the communication and processing circuitry 1941, in conjunction with the transceiver 1914 and antennas/antenna array 1916 shown and described above in connection with FIG. 19, may provide a means for transmit the retransmission of the TB on the second carrier.

Of course, in the above examples, the circuitry included in the processor 1404, processor 1704, and/or the processor 1904 is merely provided as an example, and other means for carrying out the described functions may be included within various aspects of the present disclosure, including but not limited to the instructions stored in the computer-readable medium 1410 and/or computer-readable medium 1610, or any other suitable apparatus or means described in any one of the FIGS. 1, 3, 7, 8, 10, 11, and/or 13, and utilizing, for example, the processes and/or algorithms described herein in relation to FIGS. 3-10, 12, 13, 15, 16, 18, and/or 20.

The following provides an overview of the present disclosure:

Aspect 1. A method of cross-carrier retransmission in a wireless communication network at a transmitting sidelink wireless communication device, comprising: assigning a transport block (TB) to a logical hybrid automatic repeat request (HARQ) entity, mapping the TB to an available component carrier in a plurality of component carriers, transmitting the TB to a receiving sidelink wireless communication device on the available component carrier, the TB being associated with a first sidelink control information (SCI) that cross-references the TB to at least one of a TB index number or a logical HARQ entity index number of the logical HARQ entity, mapping the TB to a different available component carrier in the plurality of component carriers, retransmitting the TB on the different available component carrier, the retransmitted TB being associated with a second SCI that cross-references the retransmitted TB to the logical HARQ entity.

Aspect 2. The method of aspect 1, further comprising: performing a first listen before talk (LBT) process prior to mapping the TB to the available component carrier to identify the available component carrier in the plurality of component carriers, performing a second LBT process, subsequent to the first LBT process and prior to mapping the TB to the different available component carrier to identify the different available component carrier.

Aspect 3. The method of aspect 1 or 2, wherein the logical HARQ entity is associated with the available carrier for transmitting the TB to the receiving sidelink wireless communication device and associated with the different available component carrier for retransmitting the TB to the receiving sidelink wireless communication device.

Aspect 4. The method of any of aspects 1 through 3, wherein the logical HARQ entity changes its association with component carriers in the plurality of component carriers based on a listen before talk (LBT) process and is different from a physical HARQ entity that maintains an association with a component carrier in the plurality of component carriers independent of the LBT process.

Aspect 5. The method of any of aspects 1 through 4, wherein the first SCI and the second SCI are second stage SCIs transported on a physical sidelink shared channel (PSSCH).

Aspect 6. The method of any of aspects 1 through 5, wherein the logical HARQ entity is associated with all component carriers of the plurality of component carriers.

Aspect 7. The method of aspect 6, further comprising: associating a logical HARQ process identifier with the TB.

Aspect 8. The method of aspect 6, wherein the plurality of component carriers are intra-band component carriers.

Aspect 9. The method of any of aspects 1 through 8, wherein the logical HARQ entity is at least one of a plurality of logical HARQ entities, further comprising: associating a physical HARQ entity index number to the TB.

Aspect 10. The method of aspect 9, wherein the plurality of component carriers comprise at least one of intra-band component carriers or inter-band component carriers.

Aspect 11. The method of any of aspects 1 through 10, wherein the first SCI and the second SCI each indicate at least one of: a TB index number of the TB, a logical HARQ entity index number associated with the TB, a physical HARQ entity index number associated with the TB, or a physical HARQ process identifier associated with the TB.

Aspect 12. The method of any of aspects 1 through 11, wherein the plurality of component carriers are in an unlicensed spectrum.

Aspect 13. A method of wireless communication at a receiving sidelink wireless communication device, comprising: detecting a transport block (TB), transmitted from a transmitting sidelink wireless communication device, on a first component carrier of a plurality of component carriers, the TB being associated with a first sidelink control information (SCI) that cross-references the TB to at least one of a TB index number or a logical hybrid automatic repeat request (HARQ) entity index number, mapping the TB to a logical HARQ entity corresponding to the at least one of the TB index number or the logical HARQ entity index number, detecting a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number, mapping the retransmission of the TB to the logical HARQ entity corresponding to the at least one of the TB index number or the logical HARQ entity index number.

Aspect 14. The method of aspect 12, wherein the logical HARQ entity is associated with all component carriers of the plurality of component carriers.

Aspect 15. The method of aspect 14, wherein the plurality of component carriers are intra-band component carriers.

Aspect 16. The method of any of aspects 13 through 15, further comprising: associating a physical HARQ process identifier with the TB based on the first and/or second SCI.

Aspect 17. The method of any of aspects 13 through 16, wherein the logical HARQ entity is at least one of a plurality of logical HARQ entities, further comprising: associating a physical HARQ entity index number to the TB based on the first and/or second SCI.

Aspect 18. The method of aspect 17, wherein the plurality of component carriers comprise at least one of intra-band component carriers or inter-band component carriers.

Aspect 19. The method of any of aspects 13 through 18, wherein the first SCI and the second SCI each indicate at least one of: a TB index number of the TB, a logical HARQ entity index number associated with the TB, a physical HARQ entity index number associated with the TB, or a physical HARQ process identifier associated with the TB.

Aspect 20. The method of any of aspects 13 through 19, wherein the plurality of component carriers are in an unlicensed spectrum.

Aspect 21. A method of cross-carrier retransmission in an unlicensed band of a wireless communication network at a transmitting sidelink wireless communication device, comprising: generating one or more packets, each comprising a respective transport block (TB) and a respective sidelink control information (SCI) indicating a respective component carrier of one or more component carriers designated for TB retransmission, performing a respective listen before talk (LBT) process on each of the one or more component carriers, transmitting a selected packet of the one or more packets on a component carrier of the one or more component carriers based on the LBT processes.

Aspect 22. The method of aspect 21, wherein the one or more packets comprise a single packet generated for use on any of the one or more component carriers, and the respective SCI, associated with the single packet, indicates a single component carrier of the one or more component carriers designated for TB retransmission, further comprising: transmitting the single packet as the selected packet on any single component carrier of the one or more component carriers associated with a successful LBT process.

Aspect 23. The method of aspect 21 or 22, wherein the one or more packets comprises a plurality of packets each generated for use on any of the one or more component carriers, and each having a respective SCI that indicates a different component carrier of the one or more component carriers designated for TB retransmission, further comprising: transmitting a selected packet of the one or more packets on any single component carrier of the one or more component carriers associated with a successful LBT process, wherein the selected packet is selected based on a TB index number or a logical HARQ entity index number associated with the respective TB.

Aspect 24. A method of transport block (TB) retransmission at a transmitting sidelink wireless communication device in a wireless communication network, comprising: transmitting an initial transmission of a transport block (TB), associated with a first physical hybrid automatic repeat request (HARQ) entity, on a first carrier, indicating to a receiving sidelink wireless communication device a mapping of a retransmission of the TB, carried on a second carrier associated with a second physical HARQ entity, to the first physical HARQ entity, transmitting the retransmission of the TB on the second carrier, wherein the second carrier is different from the first carrier and the second physical HARQ entity is different from the first physical HARQ entity.

Aspect 25. The method of aspect 24, wherein the mapping of the retransmission of the TB is indicated in a sidelink control information (SCI) or a medium access control-control element (MAC-CE).

Aspect 26. The method of aspect 24 or 25, further comprising: generating a sidelink control information (SCI) comprising: at least one of: a TB index number of the TB or a physical HARQ entity identifier of the first physical HARQ entity, and an identifier of the second carrier, indicating the mapping to the receiving sidelink wireless communication device by transmitting the SCI with the initial transmission of the TB.

Aspect 27. The method of any of aspects 24 through 26, wherein the initial transmission and the retransmission occur in a licensed band of the wireless communication network.

Aspect 28. The method of any of aspects 24 through 27, wherein the retransmission of the TB is intra-band or inter-band relative to the initial transmission of the TB.

Aspect 29: A transmitting sidelink wireless communication device configured for sidelink wireless communication comprising a processor, and a memory coupled to the processor, the processor and memory configured to perform a method of any one of aspects 1 through 12 or 21 through 28.

Aspect 30: A transmitting sidelink wireless communication device configured for sidelink wireless communication comprising at least one means for performing a method of any one of aspects 1 through 12 or 21 through 28.

Aspect 31: A non-transitory computer-readable medium storing computer-executable code, comprising code for causing a transmitting sidelink wireless communication device to perform a method of any one of aspects 1 through 12 or 21 through 28.

Aspect 32: A receiving sidelink wireless communication device configured for sidelink wireless communication comprising a processor, and a memory coupled to the processor, the processor and memory configured to perform a method of any one of aspects 13 through 20.

Aspect 33: A receiving sidelink wireless communication device configured for sidelink wireless communication comprising at least one means for performing a method of any one of aspects 13 through 20.

Aspect 34: A non-transitory computer-readable medium storing computer-executable code, comprising code for causing a receiving sidelink wireless communication device to perform a method of any one of aspects 13 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of cross-carrier retransmission in a wireless communication network at a transmitting sidelink wireless communication device, comprising:

assigning a transport block (TB) to a logical hybrid automatic repeat request (HARQ) entity;

mapping the TB to an available component carrier in a plurality of component carriers;

transmitting the TB to a receiving sidelink wireless communication device on the available component carrier, the TB being associated with a first sidelink control information (SCI) that cross-references the TB to at least one of a TB index number or a logical HARQ entity index number of the logical HARQ entity;

mapping the TB to a different available component carrier in the plurality of component carriers; and retransmitting the TB on the different available component carrier, the retransmitted TB being associated with a second SCI that cross-references the retransmitted TB to the logical HARQ entity.

2. The method of claim 1, further comprising:

performing a first listen before talk (LBT) process prior to mapping the TB to the available component carrier to identify the available component carrier in the plurality of component carriers; and performing a second LBT process, subsequent to the first LBT process and prior to mapping the TB to the different available component carrier to identify the different available component carrier.

3. The method of claim 1, wherein the logical HARQ entity is associated with the available component carrier for transmitting the TB to the receiving sidelink wireless communication device and associated with the different available component carrier for retransmitting the TB to the receiving sidelink wireless communication device.

4. The method of claim 1, wherein the logical HARQ entity changes its association with component carriers in the plurality of component carriers based on a listen before talk (LBT) process and is different from a physical HARQ entity that maintains an association with a component carrier in the plurality of component carriers independent of the LBT process.

5. The method of claim 1, wherein the first SCI and the second SCI are second stage SCIs transported on a physical sidelink shared channel (PSSCH).

6. The method of claim 1, wherein the logical HARQ entity is associated with all component carriers of the plurality of component carriers.

7. The method of claim 6, further comprising:

associating a logical HARQ process identifier with the TB.

8. The method of claim 6, wherein the plurality of component carriers are intra-band component carriers.

9. The method of claim 1, wherein the logical HARQ entity is at least one of a plurality of logical HARQ entities, further comprising:

associating a physical HARQ entity index number to the TB.

10. The method of claim 9, wherein the plurality of component carriers comprise at least one of intra-band component carriers or inter-band component carriers.

11. The method of claim 1, wherein the first SCI and the second SCI each indicate at least one of:

a TB index number of the TB, a logical HARQ entity index number associated with the TB, a physical HARQ entity index number associated with the TB, or a physical HARQ process identifier associated with the TB.

12. The method of claim 1, wherein the plurality of component carriers are in an unlicensed spectrum.

13. A method of wireless communication at a receiving sidelink wireless communication device, comprising:

detecting a transport block (TB), transmitted from a transmitting sidelink wireless communication device, on a first component carrier of a plurality of component carriers, the TB being associated with a first sidelink control information (SCI) that cross-references the TB to at least one of a TB index number or a logical hybrid automatic repeat request (HARQ) entity index number;

mapping the TB to a logical HARQ entity corresponding to the at least one of the TB index number or the logical HARQ entity index number;

detecting a retransmission of the TB on a second component carrier of the plurality of component carriers, the second component carrier being different from the first component carrier, the retransmission of the TB being associated with a second SCI that cross-references the TB to at least one of the TB index number or the logical HARQ entity index number; and mapping the retransmission of the TB to the logical HARQ entity corresponding to the at least one of the TB index number or the logical HARQ entity index number.

14. The method of claim 12, wherein the logical HARQ entity is associated with all component carriers of the plurality of component carriers.

15. The method of claim 14, wherein the plurality of component carriers are intra-band component carriers.

16. The method of claim 13, further comprising:

associating a physical HARQ process identifier with the TB based on the first and/or second SCI.

17. The method of claim 13, wherein the logical HARQ entity is at least one of a plurality of logical HARQ entities, further comprising:

associating a physical HARQ entity index number to the TB based on the first and/or second SCI.

18. The method of claim 17, wherein the plurality of component carriers comprise at least one of intra-band component carriers or inter-band component carriers.

19. The method of claim 13, wherein the first SCI and the second SCI each indicate at least one of:

a TB index number of the TB, a logical HARQ entity index number associated with the TB, a physical HARQ entity index number associated with the TB, or a physical HARQ process identifier associated with the TB.

20. The method of claim 13, wherein the plurality of component carriers are in an unlicensed spectrum.

21. A method of cross-carrier retransmission in an unlicensed band of a wireless communication network at a transmitting sidelink wireless communication device, comprising:

generating one or more packets, each comprising a respective transport block (TB) and a respective sidelink control information (SCI) indicating a respective component carrier of one or more component carriers designated for TB retransmission;

performing a respective listen before talk (LBT) process on each of the one or more component carriers; and transmitting a selected packet of the one or more packets on a component carrier of the one or more component carriers based on the LBT processes.

22. The method of claim 21, wherein the one or more packets comprise a single packet generated for use on any of the one or more component carriers, and the respective SCI, associated with the single packet, indicates a single component carrier of the one or more component carriers designated for TB retransmission, further comprising:

transmitting the single packet as the selected packet on any single component carrier of the one or more component carriers associated with a successful LBT process.

23. The method of claim 21, wherein the one or more packets comprises a plurality of packets each generated for use on any of the one or more component carriers, and each having a respective SCI that indicates a different component carrier of the one or more component carriers designated for TB retransmission, further comprising:

transmitting a selected packet of the one or more packets on any single component carrier of the one or more component carriers associated with a successful LBT process, wherein the selected packet is selected based on a TB index number or a logical HARQ entity index number associated with the respective TB.

24. A method of transport block (TB) retransmission at a transmitting sidelink wireless communication device in a wireless communication network, comprising:

transmitting an initial transmission of a transport block (TB), associated with a first physical hybrid automatic repeat request (HARQ) entity, on a first carrier;

indicating to a receiving sidelink wireless communication device a mapping of a retransmission of the TB, carried on a second carrier associated with a second physical HARQ entity, to the first physical HARQ entity; and transmitting the retransmission of the TB on the second carrier, wherein the second carrier is different from the first carrier and the second physical HARQ entity is different from the first physical HARQ entity.

25. The method of claim 24, wherein the mapping of the retransmission of the TB is indicated in a sidelink control information (SCI) or a medium access control-control element (MAC-CE).

26. The method of claim 24, further comprising:

generating a sidelink control information (SCI) comprising:

at least one of: a TB index number of the TB or a physical HARQ entity identifier of the first physical HARQ entity, and an identifier of the second carrier; and indicating the mapping to the receiving sidelink wireless communication device by transmitting the SCI with the initial transmission of the TB.

27. The method of claim 24, wherein the initial transmission and the retransmission occur in a licensed band of the wireless communication network.

28. The method of claim 24, wherein the retransmission of the TB is intra-band or inter-band relative to the initial transmission of the TB.

* * * * *